(12) United States Patent
Morita et al.

(10) Patent No.: US 10,378,466 B2
(45) Date of Patent: Aug. 13, 2019

(54) CONTROL SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Yuki Morita, Susono (JP); Kinji Morihiro, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 339 days.

(21) Appl. No.: 15/263,513

(22) Filed: Sep. 13, 2016

(65) Prior Publication Data

US 2017/0074194 A1     Mar. 16, 2017

(30) Foreign Application Priority Data

Sep. 15, 2015   (JP) ................. 2015-181916

(51) Int. Cl.
   *F01N 3/18*          (2006.01)
   *F02D 41/14*        (2006.01)
   (Continued)

(52) U.S. Cl.
   CPC ......... *F02D 41/1454* (2013.01); *B01D 53/94* (2013.01); *F01N 3/18* (2013.01);
   (Continued)

(58) Field of Classification Search
   CPC .............. B01D 53/94; B01D 2255/908; B01D 53/9445; F01N 11/00; F01N 11/007;
   (Continued)

(56) References Cited

U.S. PATENT DOCUMENTS

| 8,561,394 | B2 * | 10/2013 | Porten | F01N 3/0842 |
| | | | | 30/280 |
| 2002/0123831 | A1 * | 9/2002 | Nakagawa | B60K 6/48 |
| | | | | 701/22 |

(Continued)

FOREIGN PATENT DOCUMENTS

| JP | 2014-025355 A | | 2/2014 |
| JP | 2014025355 A | * | 2/2014 |
| WO | 2014/118892 A1 | | 8/2014 |

*Primary Examiner* — Jason D Shanske
*Assistant Examiner* — Matthew T Largi
(74) *Attorney, Agent, or Firm* — Hunton Andrews Kurth LLP

(57) ABSTRACT

The control system of the internal combustion engine comprises a control part controlling an air-fuel ratio of the exhaust gas flowing into the exhaust purification catalyst. The control part alternately sets a target air-fuel ratio between a rich air-fuel ratio and a lean air-fuel ratio and controls the air-fuel ratio of the exhaust gas so that an output air-fuel ratio of the air-fuel ratio sensor becomes the target air-fuel ratio. The control part corrects the output air-fuel ratio of the air-fuel ratio sensor so that when a scavenging occurs, the air-fuel ratio of the exhaust gas changes to a rich side more than an amount of deviation expected to occur in the output air-fuel ratio due to the occurrence of the scavenging. The control part increases a lean degree of the target air-fuel ratio when the scavenging occurs compared with when the scavenging does not occur.

8 Claims, 12 Drawing Sheets

(51) Int. Cl.

| | |
|---|---|
| *F02D 13/02* | (2006.01) |
| *F02D 41/38* | (2006.01) |
| *B01D 53/94* | (2006.01) |
| *F02B 25/14* | (2006.01) |
| *F02D 41/02* | (2006.01) |
| *F02D 41/00* | (2006.01) |
| *F01N 11/00* | (2006.01) |
| *F02B 25/00* | (2006.01) |
| *F02B 37/00* | (2006.01) |
| *F02B 75/12* | (2006.01) |

(52) U.S. Cl.
CPC ............ F01N 11/007 (2013.01); F02B 25/00 (2013.01); F02B 25/145 (2013.01); F02D 13/0219 (2013.01); F02D 13/0261 (2013.01); F02D 41/0007 (2013.01); F02D 41/0295 (2013.01); F02D 41/1441 (2013.01); F02D 41/1475 (2013.01); F02D 41/38 (2013.01); *B01D 53/9445* (2013.01); *B01D 53/9477* (2013.01); *B01D 53/9495* (2013.01); *B01D 2255/908* (2013.01); *F01N 2560/025* (2013.01); *F01N 2560/14* (2013.01); *F01N 2900/1624* (2013.01); *F02B 37/00* (2013.01); *F02B 2075/125* (2013.01); *F02D 2041/001* (2013.01); *F02D 2041/389* (2013.01); *F02D 2200/0814* (2013.01); *Y02T 10/123* (2013.01); *Y02T 10/144* (2013.01); *Y02T 10/18* (2013.01); *Y02T 10/22* (2013.01); *Y02T 10/47* (2013.01)

(58) Field of Classification Search
CPC .......... F01N 3/18; F02B 25/00; F02B 25/145; F02D 13/0219; F02D 13/0261; F02D 41/0007; F02D 41/0295; F02D 41/1441; F02D 41/1454; F02D 41/1475; F02D 41/38

See application file for complete search history.

(56) References Cited

U.S. PATENT DOCUMENTS

| | | | |
|---|---|---|---|
| 2008/0190405 A1* | 8/2008 | Eser | F02B 37/16 123/676 |
| 2009/0228187 A1* | 9/2009 | Nakamura | F01L 1/022 701/103 |
| 2009/0235907 A1* | 9/2009 | Satou | F01M 13/0011 123/574 |
| 2011/0313642 A1* | 12/2011 | Sano | F02D 13/06 701/104 |
| 2012/0316756 A1* | 12/2012 | Tsuyuki | F02D 35/023 701/104 |
| 2016/0061084 A1 | 3/2016 | Okazaki et al. | |

\* cited by examiner

CONTROL SYSTEM OF INTERNAL COMBUSTION ENGINE

CROSS-REFERENCE TO RELATED APPLICATIONS

The present application claims priority to Japanese Patent Application No. 2015-181916 filed on Sep. 15, 2015, which is incorporated herein by reference in its entirety.

TECHNICAL FIELD

The present invention relates to a control system of an internal combustion engine.

BACKGROUND ART

Known in the past has been a control system of an internal combustion engine comprising an exhaust purification catalyst provided in an exhaust passage of the internal combustion engine and an upstream side air-fuel ratio sensor provided at the upstream side of the exhaust purification catalyst in the direction of exhaust flow, wherein the control system is provided with a control part controlling an air-fuel ratio of the exhaust gas. In such a control system of an internal combustion engine, for example, the control part is used for feedback control of the air-fuel ratio of the exhaust gas flowing into the exhaust purification catalyst so that the output air-fuel ratio of the upstream side air-fuel ratio sensor becomes a target air-fuel ratio. In addition, the target air-fuel ratio is alternately set to an air-fuel ratio richer than the stoichiometric air-fuel ratio (below, referred to as a "rich air-fuel ratio") and a lean air-fuel ratio leaner than the stoichiometric air-fuel ratio (below, referred to as a "lean air-fuel ratio") (for example, PLT 1).

Further, in an internal combustion engine, when the pressure inside an intake port is higher than the pressure inside an exhaust port and valve overlap between an intake valve and an exhaust valve occurs, air is blown from the intake port through the inside of a cylinder to the exhaust port in a "scavenging" action. If scavenging occurs, the output air-fuel ratio of the upstream side air-fuel ratio sensor deviates to the rich side. Therefore, it has been proposed to estimate the ratio of the amount of scavenging to the amount of intake air (below, referred to as "the scavenging rate") and correct the target air-fuel ratio by exactly the amount of deviation in the output air-fuel ratio of the upstream side air-fuel ratio sensor based on the estimated scavenging rate (for example, PLT 2).

CITATION LIST

Patent Literature

PLT 1: International Publication No. 2014/118892A
PLT 2: Japanese Patent Publication No. 2014-025355A

SUMMARY OF INVENTION

Technical Problem

In this regard, various techniques have been come up with as the method of estimating the scavenging rate. For example, in PLT 2, based on the output air-fuel ratio of the upstream side air-fuel ratio sensor, the scavenging rate is estimated. However, depending on the method of estimation of the scavenging rate, it is not possible to accurately estimate the scavenging rate. The estimated value of the scavenging rate ends up with a certain extent of error.

On the other hand, the amount of deviation of the output air-fuel ratio of the upstream side air-fuel ratio sensor changes depending on the scavenging rate. For this reason, it may be considered to calculate the amount of deviation based on the estimated value of the scavenging rate and correct the output air-fuel ratio of the upstream side air-fuel ratio sensor etc., based on the estimated value of the scavenging rate.

However, as explained above, if an error occurs in the estimated value of the scavenging rate, error also occurs in the estimation of the amount of deviation in the output air-fuel ratio of the upstream side air-fuel ratio sensor. For this reason, if correcting the output air-fuel ratio of the upstream side air-fuel ratio sensor etc., based on the estimated value of the scavenging rate, the output air-fuel ratio of the upstream side air-fuel ratio sensor ends up being corrected in excess more than the actual amount of deviation or ends up being corrected smaller than the actual amount of deviation. Specifically, if the estimated value of the scavenging rate is smaller than the actual scavenging rate, the amount of lean side correction of the output air-fuel ratio of the upstream side air-fuel ratio sensor becomes smaller than the suitable value and as a result the corrected output air-fuel ratio becomes richer than the actual air-fuel ratio of the exhaust gas. Conversely, if the estimated value of the scavenging rate is larger than the actual scavenging rate, the amount of lean side correction of the output air-fuel ratio of the upstream side air-fuel ratio sensor becomes larger than a suitable value and as a result the corrected output air-fuel ratio becomes leaner than the actual air-fuel ratio of the exhaust gas.

As explained above, if correcting an output air-fuel ratio by less than the actual amount of deviation in the output air-fuel ratio of the upstream side air-fuel ratio sensor, the corrected output air-fuel ratio becomes richer than the actual air-fuel ratio of the exhaust gas. For this reason, in this case, as explained above, if performing feedback control so that the output air-fuel ratio of the upstream side air-fuel ratio sensor becomes the target air-fuel ratio, the air-fuel ratio of the exhaust gas flowing into the exhaust purification catalyst becomes an air-fuel ratio leaner than the target air-fuel ratio. Therefore, in this case, when the target air-fuel ratio is the lean air-fuel ratio, the amount of $NO_x$ in the exhaust gas flowing into the exhaust purification catalyst becomes greater. For this reason, from the viewpoint of keeping the amount of $NO_x$ in the exhaust gas flowing into the exhaust purification catalyst small, it is necessary to correct the output air-fuel ratio of the upstream side air-fuel ratio sensor to the lean side to the same as the actual amount of deviation in the output air-fuel ratio of the upstream side air-fuel ratio sensor or larger. For this reason, when scavenging occurs, it may be considered to correct the output air-fuel ratio of the upstream side air-fuel ratio sensor by as large an amount to the lean side as possible.

However, if correcting the output air-fuel ratio of the upstream side air-fuel ratio sensor by a large amount to the lean side, when the estimated value of the scavenging rate does not include that much error, the output air-fuel ratio ends up being excessively corrected to the lean side. If excessively correcting the output air-fuel ratio to the lean side, as explained above, despite the control part setting the target air-fuel ratio to a lean air-fuel ratio, the actual air-fuel ratio of the exhaust gas flowing into the exhaust purification catalyst sometimes ends up becoming a rich air-fuel ratio. In this case, even if alternately switching the target air-fuel ratio between the rich air-fuel ratio and the lean air-fuel ratio, the actual air-fuel ratio of the exhaust gas flowing into the exhaust purification catalyst ends up becoming a rich air-fuel ratio at all times. It no longer become possible for the exhaust purification catalyst to remove the unburned HC, CO, etc. (below, referred to as "unburned gas") in the exhaust gas.

Therefore, in consideration of this problem, an object of the present invention is to provide an internal combustion engine able to remove unburned gas in exhaust gas even if making the air-fuel ratio of the exhaust gas flowing into the exhaust purification catalyst excessively change to the rich side when scavenging occurs.

Solution to Problem

The present invention is has been made to solve the above problem, and its summary is as follows.

(1) A control system of an internal combustion engine controlling an internal combustion engine comprising a variable valve timing mechanism able to change an amount of valve overlap between an intake valve and an exhaust valve, an exhaust purification catalyst arranged in an exhaust passage and able to store oxygen, and an upstream side air-fuel ratio sensor arranged at an upstream side of the exhaust purification catalyst in a direction of exhaust flow and detecting an air-fuel ratio of exhaust gas flowing into the exhaust purification catalyst, wherein the control system comprises a control part controlling an air-fuel ratio of the exhaust gas flowing into the exhaust purification catalyst, the control part alternately sets a target air-fuel ratio between a rich air-fuel ratio richer than a stoichiometric air-fuel ratio and a lean air-fuel ratio leaner than the stoichiometric air-fuel ratio and controls the air-fuel ratio of the exhaust gas flowing into the exhaust purification catalyst so that an output air-fuel ratio of the upstream side air-fuel ratio sensor becomes the target air-fuel ratio, the control part corrects a parameter relating to the air-fuel ratio of the exhaust gas flowing into the exhaust purification catalyst so that when an occurrence of valve overlap causes air to be blown from an intake passage through a cylinder to the exhaust passage as a scavenging action, the air-fuel ratio of the exhaust gas flowing into the exhaust purification catalyst changes to a rich side more than an amount of deviation expected to occur in the output air-fuel ratio of the upstream side air-fuel ratio sensor due to the occurrence of the scavenging, and the control part increases a lean degree of the target air-fuel ratio when setting the target air-fuel ratio to the lean air-fuel ratio when the scavenging occurs compared with when the scavenging does not occur.

(2) The control system of an internal combustion engine described in above (1), wherein when the scavenging occurs, the control part increases the lean degree of the target air-fuel ratio when setting the target air-fuel ratio to the lean air-fuel ratio the higher a scavenging rate which is a ratio of an amount of scavenging to an amount of intake air.

(3) The control system of an internal combustion engine described in above (1) or (2), wherein the control part estimates an oxygen storage amount of the exhaust purification catalyst based on the output air-fuel ratio of the upstream side air-fuel ratio sensor, the control part switches the target air-fuel ratio from the lean air-fuel ratio to the rich air-fuel ratio if the target air-fuel ratio is set to the lean air-fuel ratio when the estimated value of the oxygen storage amount becomes a switching reference storage amount smaller than a maximum storable oxygen amount or becomes more, and the control part increases the switching reference storage amount when the scavenging occurs compared with when the scavenging does not occur.

(4) The control system of an internal combustion engine described in above (3), wherein when the scavenging occurs, the control part increases the switching reference storage amount the higher a scavenging rate which is a ratio of an amount of scavenging to an amount of intake air.

(5) The control system of an internal combustion engine described in any one of above (1) to (4), wherein when the scavenging occurs, the control part corrects the parameter relating to the air-fuel ratio of the exhaust gas flowing into the exhaust purification catalyst so that the higher the scavenging rate which is a ratio of an amount of scavenging to an amount of intake air, the more to the rich side the air-fuel ratio of the exhaust gas flowing into the exhaust purification catalyst changes.

(6) The control system of an internal combustion engine described in any one of above (1) to (5), wherein the parameter relating to the air-fuel ratio of the exhaust gas flowing into the exhaust purification catalyst is an output air-fuel ratio of the upstream side air-fuel ratio sensor, a control center air-fuel ratio, the target air-fuel ratio, or an amount of feed of fuel from a fuel injector injecting fuel into a combustion chamber of the internal combustion engine.

According to the present invention, it is possible to remove unburned gas in exhaust gas even if making the air-fuel ratio of the exhaust gas flowing into the exhaust purification catalyst excessively change to the rich side when scavenging occurs.

DESCRIPTION OF EMBODIMENTS

Figure 1:
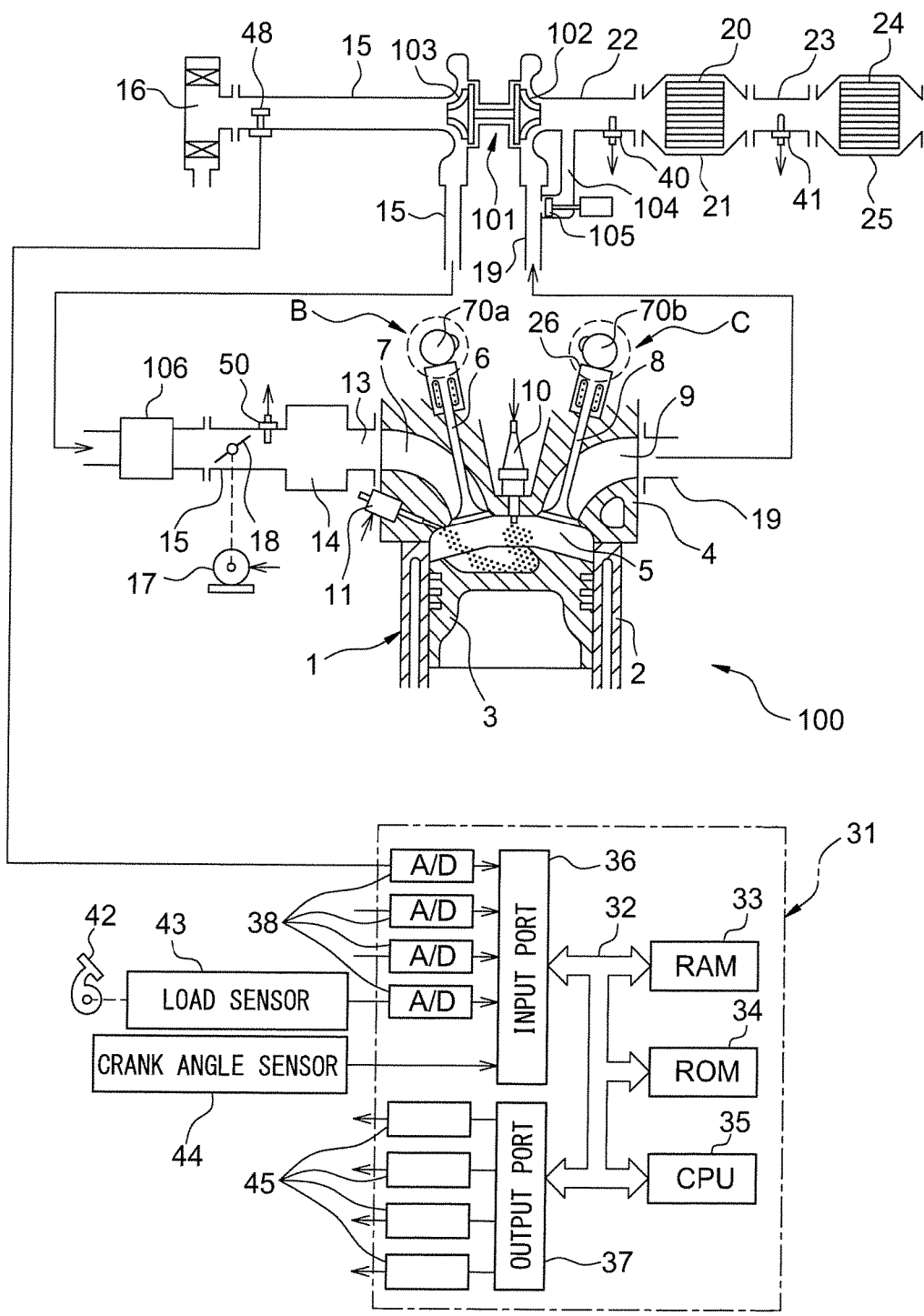
FIG. 1 is a view schematically showing an internal combustion engine according to an embodiment of the present invention.

Below, referring to the drawings, an embodiment of the present invention will be explained in detail.

Explanation of Internal Combustion Engine as Whole

FIG. 1 is a view schematically showing an internal combustion engine 100 according to an embodiment of the present invention. As shown in FIG. 1, the internal combustion engine 100 comprises an engine body 1 including a cylinder block 2 and a cylinder head 4. In the present embodiment, the internal combustion engine 100 is a spark ignition type internal combustion engine. At the inside of the cylinder block 2, a piston 3 reciprocating inside a cylinder formed in the cylinder block 2 is arranged. Between the piston 3 and the cylinder head 4, a combustion chamber 5 is formed.

At the cylinder head 4, an intake port 7 and exhaust port 9 are formed. These intake port 7 and exhaust port 9 are connected to the combustion chamber 5. At the end part of the intake port 7, an intake valve 6 is arranged. This intake valve 6 opens and closes the intake port 7. Similarly, at the end part of the exhaust port 9, an exhaust valve 8 is arranged. This exhaust valve 8 opens and closes the exhaust port 9. Further, the internal combustion engine 100 comprises a variable valve timing mechanism B able to control the opening timing and closing timing of the intake valve 6 and a variable valve timing mechanism C able to control the opening timing and closing timing of the exhaust valve 8.

Further, the internal combustion engine 100 comprises a fuel injector 11 for feeding fuel to the combustion chamber 5 and a spark plug 10 for igniting the air-fuel mixture in the combustion chamber 5. The spark plug 10 is arranged at the cylinder head 4 near the center of the cylinder. The fuel injector 11 is arranged in the vicinity of the inside wall of the cylinder head 4 so as to directly inject fuel into the combustion chamber 5. Therefore, the internal combustion engine 100 in the present embodiment is a cylinder injection type internal combustion engine. Further, the internal combustion engine 100 uses fuel comprised of gasoline with a stoichiometric air-fuel ratio of 14.6. However, in the internal combustion engine 100, other fuels may also be used.

Further, the internal combustion engine 100 according to the present embodiment comprises an exhaust turbocharger 101. The exhaust turbocharger 101 comprises a turbine 102 arranged at the exhaust passage, a compressor 103 arranged at the intake passage, and a shaft connecting the turbine 102 and compressor 103. If exhaust gas is used to make the turbine 102 rotate, the compressor 103 rotates along with this and thereby the pressure of the intake air is raised. Therefore, the exhaust turbocharger 101 can use the energy of the exhaust gas to compress the intake air and increase the amount of intake air.

The intake port 7 is connected through a corresponding intake tube 13 to a surge tank 14. The surge tank 14 is connected through an intake pipe 15 to an outlet part of the compressor 103 of the exhaust turbocharger 101. At the inside of the intake pipe 15 connecting the surge tank 14 and the compressor 103, a throttle valve 18 driven by a throttle valve-drive actuator 17 is arranged. The throttle valve 18 is made to turn by the throttle valve-drive actuator 17 whereby it is possible to change the open area of the intake passage. Further, at the intake pipe 15 between the compressor 103 and the throttle valve 18, a cooler (intercooler) 106 for cooling the intake air compressed by the exhaust turbocharger 101 is arranged. The inlet part of the compressor 103 is connected through the intake pipe 15 to an air cleaner 16. The intake port 7, intake tube 13, surge tank 14, intake pipe 15, etc. form an intake passage introducing air into the combustion chamber 5.

On the other hand, the exhaust port 9 of the cylinder is connected to the exhaust manifold 19. The exhaust manifold 19 has a plurality of tubes connected to exhaust ports 9 and a header at which these tubes are combined. The header of the exhaust manifold 19 is connected to the inlet part of the turbine 102 of the exhaust turbocharger 101. The outlet part of the turbine 102 is connected through an exhaust pipe 22 to an upstream side casing 21. The upstream side casing 21 has an upstream side exhaust purification catalyst 20 built into it. The upstream side casing 21 is connected through an exhaust pipe 23 to a downstream side casing 25. The downstream side casing 25 has a downstream side exhaust purification catalyst 24 built into it. The exhaust port 9, exhaust manifold 19, exhaust pipes 22, 23, casings 21, 25, etc. form an exhaust passage for discharging exhaust gas produced by combustion of the air-fuel mixture from the combustion chamber 5.

Between the exhaust manifold 19 at the upstream side from the turbine 102 in the direction of exhaust flow (below, referred to simply as an "upstream side") and the exhaust pipe 22 at the downstream side from the turbine 102 in the direction of exhaust flow (below, referred to simply as a "downstream side"), a bypass passage 104 bypassing the turbine 102 is arranged. At the bypass passage 104, a wastegate valve 105 which is a bypass valve opening and closing the bypass passage 104 is arranged.

The internal combustion engine 100 comprises an electronic control unit (ECU) 31 comprised of a digital computer. The ECU 31 includes components connected with each other through a bidirectional bus 32 such as a RAM (random access memory) 33, ROM (read only memory) 34, CPU (microprocessor) 35, input port 36, and output port 37.

Further, inside the intake pipe 15 between the air cleaner 16 and the compressor 103, an air flow rate detection device 48 (for example, air flow meter) detecting an intake air flow rate is arranged. Inside the exhaust pipe 22 between the turbine 102 and upstream side casing 21, an upstream side air-fuel ratio sensor 40 detecting an air-fuel ratio of exhaust gas flowing through the inside of the exhaust pipe 22 (that is, exhaust gas flowing into the upstream side exhaust purification catalyst 20) is arranged. Note that, the air-fuel ratio sensor 40 may be arranged at the upstream side of the turbine 102. In addition, inside the exhaust pipe 23 between the upstream side exhaust purification catalyst 20 and the downstream side exhaust purification catalyst 24, a downstream side air-fuel ratio sensor 41 detecting an air-fuel ratio of exhaust gas flowing through the inside of the exhaust pipe 23 (that is, exhaust gas flowing out from the upstream side exhaust purification catalyst 20 and flowing into the downstream side exhaust purification catalyst 24) is arranged. In addition, inside the intake passage at the downstream side from the throttle valve 18 in the direction of intake flow, a pressure sensor 50 detecting the pressure inside the intake passage, in particular, the supercharging pressure, is arranged.

The output signals of the upstream side air-fuel ratio sensor 40, downstream side air-fuel ratio sensor 41, air flow rate detection device 48, and pressure sensor 50 are input through corresponding AD converters 38 to the input port 36. Further, the internal combustion engine 100 comprises an accelerator pedal 42, while the accelerator pedal 42 has a load sensor 43 connected to it. The load sensor 43 generates an output voltage proportional to the amount of depression of the accelerator pedal 42. The output voltage of the load sensor 43 is input to the input port 36 through the corresponding AD converter 38.

In addition, the internal combustion engine 100 comprises a crank angle sensor 44. The crank angle sensor 44 generates an output pulse each time the crankshaft rotates by for example a predetermined angle. The output pulses are input to the input port 36. In the CPU 35, based on the output pulse of the crank angle sensor 44, the engine speed is calculated.

On the other hand, the output port 37 of the ECU 31 is connected through corresponding drive circuits 45 to the spark plug 10, fuel injector 11, throttle valve-drive actuator 17, wastegate valve 105, and variable valve timing mechanisms B, C. The ECU 31 can control the ignition timing of the spark plug 10, the fuel injection timing and fuel injection amount of the fuel injector 11, the opening degree of the throttle valve 18, the opening degree of the wastegate valve 105, the opening timing and closing timing of the intake valve 6, and the opening timing and closing timing of the exhaust valve 8. Note that, the ECU 31 functions as a control part controlling the air-fuel ratio of the exhaust gas flowing into the upstream side exhaust purification catalyst 20.

Explanation of Exhaust Purification Catalyst

The upstream side exhaust purification catalyst 20 and the downstream side exhaust purification catalyst 24 are three-way catalysts which have an oxygen storage ability. Specifically, the exhaust purification catalysts 20 and 24 are three-way catalysts which comprises a carrier made of ceramic on which a precious metal (for example, platinum Pt) having a catalyst effect and a substance having an oxygen storage ability (for example, ceria $CeO_2$) are carried. A three-way catalyst has the function of simultaneously purifying unburned HC, CO, etc., (below, referred to as "unburned gas") and $NO_x$ when the air-fuel ratio of the exhaust gas flowing into the three-way catalyst is maintained at the stoichiometric air-fuel ratio. In addition, when the exhaust purification catalysts 20 and 24 store a certain extent of oxygen, the unburned gas and $NO_x$ are simultaneously purified even if the air-fuel ratio of the exhaust gas flowing into the exhaust purification catalysts 20 and 24 somewhat deviates from the stoichiometric air-fuel ratio to the rich side or lean side.

Accordingly, if the exhaust purification catalysts 20 and 24 have oxygen storage ability, that is, if the oxygen storage amount of the exhaust purification catalysts 20 and 24 is less than the maximum storage oxygen amount, when the air-fuel ratio of the exhaust gas flowing into the exhaust purification catalysts 20, 24 becomes somewhat leaner than the stoichiometric air-fuel ratio, the excess oxygen contained in the exhaust gas is stored in the exhaust purification catalysts 20, 24. Therefore, the surfaces of the exhaust purification catalysts 20 and 24 are maintained at the stoichiometric air-fuel ratio. As a result, on the surfaces of the exhaust purification catalysts 20 and 24, the unburned gas and $NO_x$ are simultaneously purified. At this time, the air-fuel ratio of the exhaust gas flowing out from the exhaust purification catalysts 20 and 24 becomes the stoichiometric air-fuel ratio.

On the other hand, if exhaust purification catalysts 20 and 24 can release oxygen, that is, the oxygen storage amount of the exhaust purification catalysts 20 and 24 is more than zero, when the air-fuel ratio of the exhaust gas flowing into the exhaust purification catalysts 20, 24 becomes somewhat richer than the stoichiometric air-fuel ratio, the oxygen which is insufficient for reducing the unburned gas contained in the exhaust gas, is released from the exhaust purification catalysts 20 and 24. Therefore, the surfaces of the exhaust purification catalysts 20 and 24 are maintained at the stoichiometric air-fuel ratio. As a result, on the surfaces of the exhaust purification catalysts 20 and 24, the unburned gas and $NO_x$ are simultaneously purified. At this time, the air-fuel ratio of the exhaust gas flowing out from the exhaust purification catalysts 20 and 24 becomes the stoichiometric air-fuel ratio.

In this way, when the exhaust purification catalysts 20, 24 store a certain extent of oxygen, even if the air-fuel ratio of the exhaust gas flowing into the exhaust purification catalysts 20, 24 deviates slightly from the stoichiometric air-fuel ratio to the rich side or lean side, the unburned gas and $NO_x$ are simultaneously removed and the air-fuel ratio of the exhaust gas flowing out from the exhaust purification catalysts 20, 24 becomes the stoichiometric air-fuel ratio.

Explanation of Air-Fuel Ratio Sensors

Figure 2:
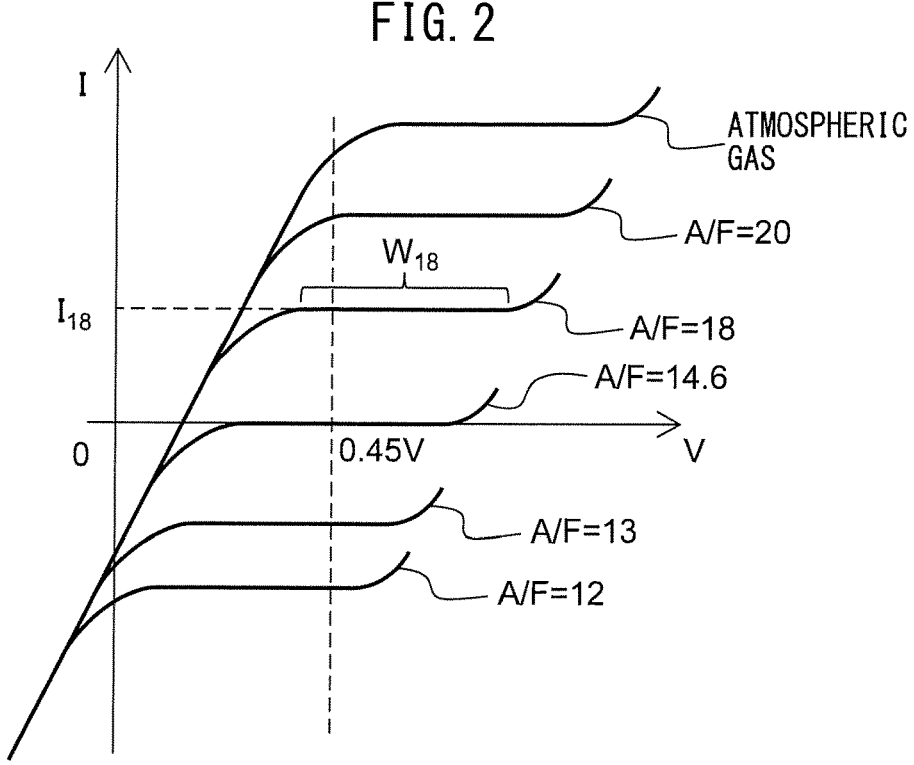
FIG. 2 is a view showing the relationship between an applied voltage V and output current I at different exhaust air-fuel ratios A/F.
Figure 3:
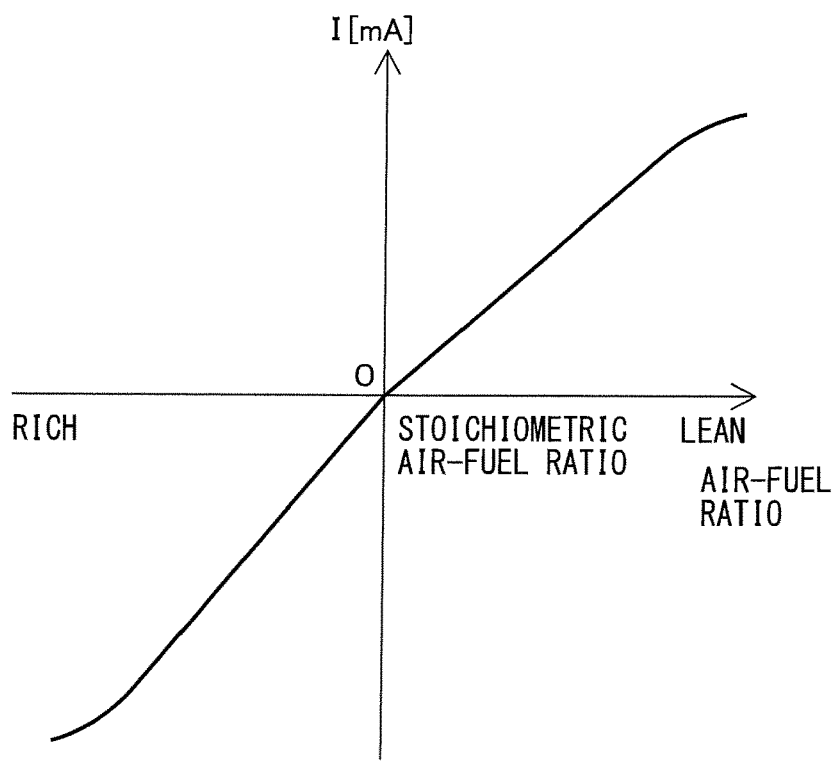
FIG. 3 is a view showing the relationship between an air-fuel ratio and output current I when making the applied voltage V constant.

Next, referring to FIG. 2 and FIG. 3, the output characteristics of the air-fuel ratio sensors 40, 41 in the present embodiment will be explained. FIG. 2 is a view showing the voltage-current (V-I) characteristics of the air-fuel ratio sensors 40, 41 in the present embodiment, while FIG. 3 is a view showing the relationship between the air-fuel ratio of the exhaust gas circulating around the air-fuel ratio sensors 40, 41 (below, referred to as the "exhaust air-fuel ratio") and the output current I when maintaining the applied voltage constant. Note that, in the present embodiment, as the air-fuel ratio sensors 40, 41, the same configurations of air-fuel ratio sensors are used.

As will be understood from FIG. 2, in the air-fuel ratio sensors 40, 41 of the present embodiment, the output current I becomes larger the higher the exhaust air-fuel ratio (the leaner). Further, in the V-I line of each exhaust air-fuel ratio, there is a region substantially parallel to the V-axis, that is, a region where the output current does not change much at all even if the applied voltage changes. This voltage region is called the "limit current region". The current at this time is called the "limit current". In FIG. 2, the limit current region and the limit current when the exhaust air-fuel ratio is 18 are respectively shown by $W_{18}$ and $I_{18}$. Therefore, the air-fuel ratio sensors 40, 41 can be said to be limit current type air-fuel ratio sensors.

FIG. 3 is a view showing the relationship between the exhaust air-fuel ratio and the output current I when making the applied voltage 0.45V or so. As will be understood from FIG. 3, in the air-fuel ratio sensors 40, 41, the output current changes linearly (proportionally) with respect to the exhaust air-fuel ratio so that the higher the exhaust air-fuel ratio (that is, the leaner), the greater the output current I of the air-fuel ratio sensors 40, 41 becomes.

Note that, in the above example, as the air-fuel ratio sensors 40, 41, limit current type air-fuel ratio sensors are used. However, so long as the output current linearly changes with respect to the exhaust air-fuel ratio, as the air-fuel ratio sensors 40, 41, it is also possible to use any other air-fuel ratio sensors such as air-fuel ratio sensors not the limit current type. Further, the air-fuel ratio sensors 40, 41 may also be air-fuel ratio sensors of structures different from each other.

Basic Air-Fuel Ratio Control

Next, the air-fuel ratio control performed by a control system of an internal combustion engine according to the present embodiment will be explained. The air-fuel control in the present embodiment is performed by the ECU 31. In the air-fuel ratio control in the present embodiment, feedback control is performed based on the output air-fuel ratio of the upstream side air-fuel ratio sensor 40 to control the fuel injection amount from the fuel injector 11 so that the output air-fuel ratio of the upstream side air-fuel ratio sensor 40 becomes the target air-fuel ratio. That is, in the air-fuel ratio control in the present embodiment, feedback control is performed based on the output air-fuel ratio of the upstream side air-fuel ratio sensor 40 so that the air-fuel ratio of the exhaust gas flowing into the upstream side exhaust purification catalyst 20 becomes the target air-fuel ratio. Note that, the "output air-fuel ratio" means the air-fuel ratio which corresponds to the output value of the air-fuel ratio sensor.

Further, in the basic air-fuel ratio control of the present embodiment, target air-fuel ratio is set based on the output air-fuel ratio of the downstream side air-fuel ratio sensor 41, etc. Specifically, in the basic air-fuel ratio control in the present embodiment, the following control is performed. When the output air-fuel ratio of the downstream side air-fuel ratio sensor 41 becomes a rich air-fuel ratio, the target air-fuel ratio is set to a lean set air-fuel ratio. As a result, the air-fuel ratio of exhaust gas flowing into the upstream side exhaust purification catalyst 20 also becomes an air-fuel ratio which is equal to the lean set air-fuel ratio. In this case, "lean set air-fuel ratio" is a predetermined constant air-fuel ratio which is leaner than an air-fuel ratio serving as center of control (in the present embodiment, a stoichiometric air-fuel ratio)) by a certain extent, and, for example, is 14.75. Further, the lean set air-fuel ratio can be expressed as an air-fuel ratio acquired by adding a positive air-fuel correction amount to an air-fuel ratio serving as a control center (below, referred to as "control center air-fuel ratio"). In addition, in the present embodiment, when the output air-fuel ratio of the downstream side air-fuel ratio sensor 41 becomes a rich judged air-fuel ratio (for example, 14.55), which is slightly richer than the stoichiometric air-fuel ratio, or less, it is judged that the output air-fuel ratio of the downstream side air-fuel ratio sensor 41 has become the rich air-fuel ratio.

In addition, in the air-fuel ratio control of the present embodiment, if the oxygen storage amount OSA of the upstream side exhaust purification catalyst 20 becomes a predetermined switching reference storage amount Cref smaller than the maximum storable oxygen amount Cmax or becomes more, the target air-fuel ratio which was a lean set air-fuel ratio up to then is set to the rich set air-fuel ratio. As a result, the air-fuel ratio of the exhaust gas flowing into the upstream side exhaust purification catalyst 20 also becomes the rich set air-fuel ratio. Here, the rich set air-fuel ratio is a predetermined air-fuel ratio richer by a certain degree than the control center air-fuel ratio (in the present embodiment, stoichiometric air-fuel ratio), for example, is made 14.50. Note that, in the present embodiment, the difference of the rich set air-fuel ratio from the stoichiometric air-fuel ratio (rich degree) is made the difference of the lean set air-fuel ratio from the stoichiometric air-fuel ratio (lean degree) or is made less.

Note that, in the present embodiment, the oxygen storage amount OSA of the upstream side exhaust purification catalyst 20 is estimated based on the cumulative value of the oxygen excess/deficiency of the exhaust gas flowing into the upstream side exhaust purification catalyst 20. Here, the "oxygen excess/deficiency" means the amount of oxygen becoming in excess or the amount of oxygen becoming deficient (amount of excess unburned gas) when trying to make the air-fuel ratio of the exhaust gas flowing into the upstream side exhaust purification catalyst 20 the stoichiometric air-fuel ratio. In particular, during the time period when the target air-fuel ratio is set to the lean set air-fuel ratio, the oxygen in the exhaust gas flowing into the upstream side exhaust purification catalyst 20 becomes excessive and the excess oxygen is stored in the upstream side exhaust purification catalyst 20. Therefore, the cumulative value of the oxygen excess/deficiency (below, referred to as a "cumulative oxygen excess/deficiency") during this time period can be said to be the estimated value of the oxygen storage amount OSA of the upstream side exhaust purification catalyst 20.

The oxygen excess/deficiency is calculated based on the output air-fuel ratio of the upstream side air-fuel ratio sensor 40 and the estimated value of the amount of intake air to the combustion chamber 5, which is calculated based on the output of the air flow rate detection device 48, etc., or the amount of feed of fuel from the fuel injector 11, etc. Specifically, the oxygen excess/deficiency OED is for example calculated by the following formula (1).

$$OED = 0.23 \times Qi \times (AFup - AFR) \tag{1}$$

Here, 0.23 is the concentration of oxygen in the air, Qi is the amount of fuel injection, AFup is the output air-fuel ratio of the upstream side air-fuel ratio sensor 40, and AFR is the control center air-fuel ratio (in the present embodiment, stoichiometric air-fuel ratio).

After this, when the output air-fuel ratio of the downstream side air-fuel ratio sensor 41 again becomes the rich judged air-fuel ratio or less, the target air-fuel ratio is again made the lean set air-fuel ratio. Then, a similar operation is repeated. In this way, in the present embodiment, the target air-fuel ratio of the exhaust gas flowing into the upstream side exhaust purification catalyst 20 is alternately and repeatedly set to the lean set air-fuel ratio and the rich set air-fuel ratio. In other words, in the present embodiment, the output air-fuel ratio of the upstream side air-fuel ratio sensor 40 (i.e., the air-fuel ratio of the exhaust gas flowing into the upstream side exhaust purification catalyst 20) is alternately switched between the rich air-fuel ratio and the lean air-fuel ratio.

Explanation of Normal Air Fuel Ratio Control Using Time Chart

Figure 4:
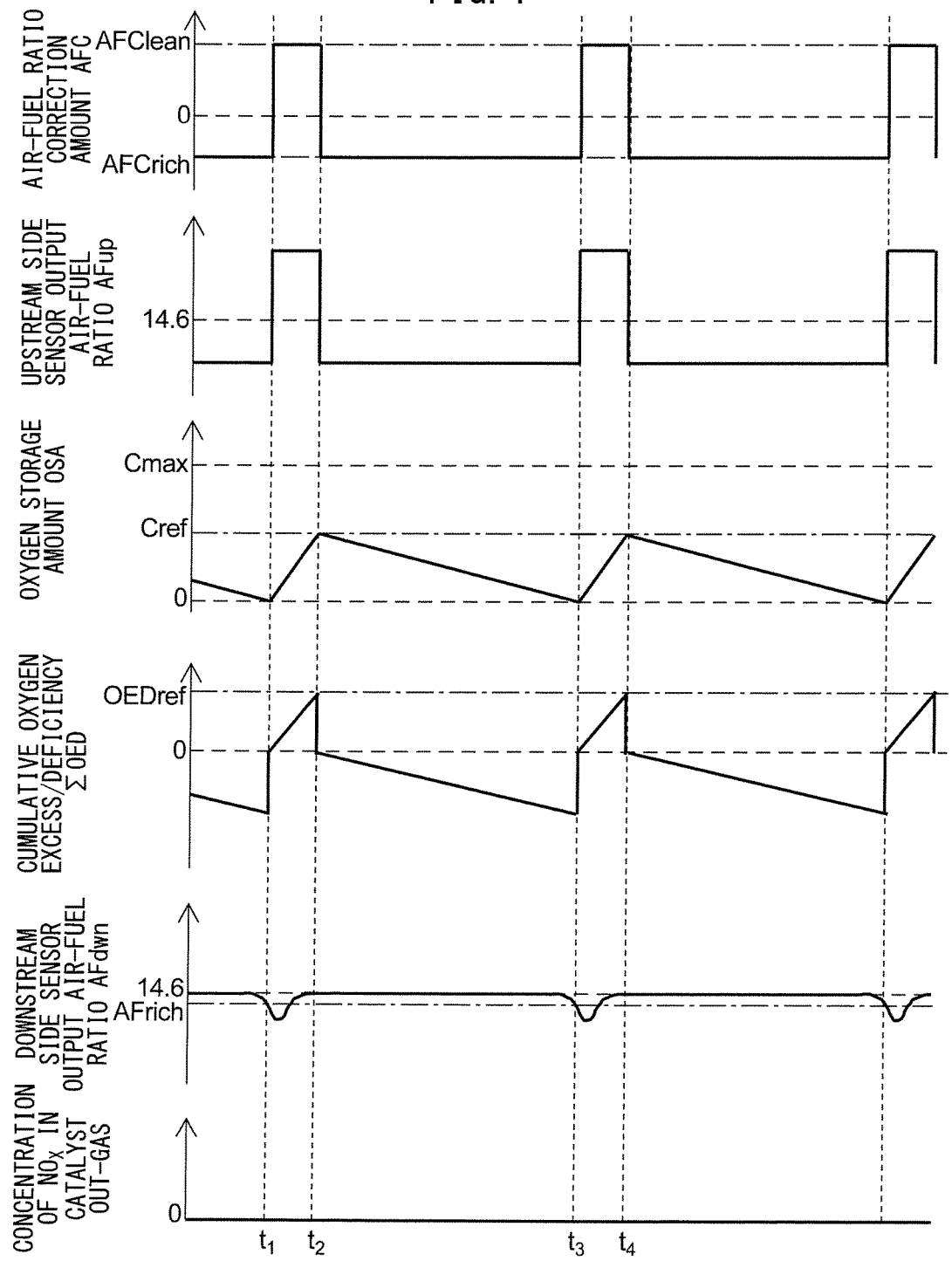
FIG. 4 is a time chart showing a change in the oxygen storage amount of the upstream side exhaust purification catalyst etc. when performing basic air-fuel ratio control.

Referring to FIG. 4, the operation explained as above will be explained in detail. FIG. 4 is a time chart of the air-fuel ratio correction amount AFC, the output air-fuel ratio AFup of the upstream side air-fuel ratio sensor 40, the oxygen storage amount OSA of the upstream side exhaust purification catalyst 20, the cumulative oxygen excess/deficiency ΣOED, the output air-fuel ratio AFdwn of the downstream side air-fuel ratio sensor 41, and the concentration of $NO_x$ in the exhaust gas flowing out from the upstream side exhaust purification catalyst 20, when performing the basic air-fuel ratio control of the present embodiment.

Note that the air-fuel ratio correction amount AFC is a correction amount relating to the target air-fuel ratio of the exhaust gas flowing into the upstream side exhaust purification catalyst 20. When the air-fuel ratio correction amount AFC is 0, the target air-fuel ratio is set to an air-fuel ratio which is equal to the control center air-fuel ratio (in the present embodiment, the stoichiometric air-fuel ratio). On the other hand, when the air-fuel ratio correction amount AFC is a positive value, the target air-fuel ratio becomes an air-fuel ratio leaner than the control center air-fuel ratio (in the present embodiment, the lean air-fuel ratio), while when the air-fuel ratio correction amount AFC is a negative value, the target air-fuel ratio becomes an air-fuel ratio richer than the control center air-fuel ratio (in the present embodiment, rich air-fuel ratio). Further, the "control center air-fuel ratio" means the air-fuel ratio to which of the air-fuel ratio correction amount AFC is added in accordance with the engine operating state, that is, the air-fuel ratio which is the reference when changing the target air-fuel ratio in accordance with the air-fuel ratio correction amount AFC.

In the illustrated example, the air-fuel ratio correction amount AFC is alternately set to the lean set correction amount AFClean (corresponding to the lean set air-fuel ratio) and the rich set correction amount AFCrich (corresponding to the rich set air-fuel ratio). The lean set correction amount AFClean is a positive value of a correction amount, for example, 0.2 to 2.0, preferably 0.4 to 1.5 or so. Therefore, if the control center air-fuel ratio is the stoichiometric air-fuel ratio, the lean set air-fuel ratio which is the target air-fuel ratio at this time is for example made 14.62 to 16.60, preferably 14.64 to 16.10 or so. On the other hand, the rich set correction amount AFCrich is made a negative correction amount, for example, −0.2 to −2.0, preferably −0.4 to −1.5 or so. Therefore, if the control center air-fuel ratio is the stoichiometric air-fuel ratio, the rich set air-fuel ratio which is the target air-fuel ratio at this time is for example made 14.58 to 12.60, preferably 14.56 to 13.10 or so.

In the example shown in the figure, in the state before the time $t_1$, the air-fuel ratio correction amount AFC is set to the rich set correction amount AFCrich (corresponding to the rich set air-fuel ratio). That is, the target air-fuel ratio is set to a rich air-fuel ratio. Along with this, the output air-fuel ratio of the upstream side air-fuel ratio sensor 40 becomes the rich air-fuel ratio. Unburned gas contained in the exhaust gas flowing into the upstream side exhaust purification catalyst 20 is purified in the upstream side exhaust purification catalyst 20. Along with this, the oxygen storage amount OSA of the upstream side exhaust purification catalyst 20 gradually decreases. Since due to the purification in the upstream side exhaust purification catalyst 20, unburned gas, etc., is not contained in the exhaust gas flowing out from the upstream side exhaust purification catalyst 20, the output air-fuel ratio AFdwn of the downstream side air-fuel ratio sensor 41 is substantially the stoichiometric air-fuel ratio. At this time, since the air-fuel ratio of the exhaust gas flowing into the upstream side exhaust purification catalyst 20 is a rich air-fuel ratio, the NOx discharging amount from the upstream side exhaust purification catalyst 20 is substantially zero.

If the oxygen storage amount OSA of the upstream side exhaust purification catalyst 20 gradually decreases, the oxygen storage amount OSA approaches zero. Along with this, a part of the unburned gas flowing into the upstream side exhaust purification catalyst 20 starts to flow out without being purified by the upstream side exhaust purification catalyst 20. As a result, the output air-fuel ratio AFdown of the downstream side air-fuel ratio sensor 41 gradually falls, and at the time $t_1$, the output air-fuel ratio AFdwn of the downstream side air-fuel ratio sensor 41 reaches the rich judged air-fuel ratio AFrich.

In the present embodiment, if the output air-fuel ratio AFdwn of the downstream side air-fuel ratio sensor 41 becomes the rich judged air-fuel ratio AFrich or less, in order to make the oxygen storage amount OSA increase, the air-fuel ratio correction amount AFC is switched to the lean set correction amount AFClean (corresponding to lean set air-fuel ratio). Further, at this time, the cumulative oxygen excess/deficiency ΣOED is reset to zero.

If switching the target air-fuel ratio to the lean air-fuel ratio at the time $t_1$, the air-fuel ratio of the exhaust gas flowing into the upstream side exhaust purification catalyst 20 changes from the rich air-fuel ratio to the lean air-fuel ratio. If the air-fuel ratio of the exhaust gas flowing into the upstream side exhaust purification catalyst 20 changes to the lean air-fuel ratio at the time $t_1$, the oxygen storage amount OSA of the upstream side exhaust purification catalyst 20 increases. Further, along with this, the cumulative oxygen excess/deficiency ΣOED also gradually increases.

Therefore, the air-fuel ratio of the exhaust gas flowing out from the upstream side exhaust purification catalyst 20 changes to the stoichiometric air-fuel ratio, and the output air-fuel ratio AFdwn of the downstream side air-fuel ratio sensor 41 returns to the stoichiometric air-fuel ratio. At this time, the air-fuel ratio of the exhaust gas flowing into the upstream side exhaust purification catalyst 20 is the lean air-fuel ratio, but there is sufficient leeway in the oxygen storage ability of the upstream side exhaust purification catalyst 20, and therefore the oxygen in the inflowing exhaust gas is stored in the upstream side exhaust purification catalyst 20 and NOx is removed by reduction. Therefore, the exhaust of $NO_x$ from the upstream side exhaust purification catalyst 20 becomes substantially zero.

Then, if the upstream side exhaust purification catalyst 20 increases in the oxygen storage amount OSA, at the time $t_2$, the oxygen storage amount OSA of the upstream side exhaust purification catalyst 20 reaches the switching reference storage amount Cref. Therefore, the cumulative oxygen excess/deficiency ΣOED reaches the switching reference value OEDref which corresponds to the switching reference storage amount Cref. In the present embodiment, if the cumulative oxygen excess/deficiency ΣOED becomes the switching reference value OEDref or more, the storage of oxygen in the upstream side exhaust purification catalyst 20 is suspended by switching the air-fuel ratio correction amount AFC to the rich set correction amount AFCrich. Therefore, the target air-fuel ratio is made the rich air-fuel ratio. Further, at this time, the cumulative oxygen excess/deficiency ΣOED is reset to 0.

Note that the switching reference storage amount Cref is set to an amount sufficiently small so that the oxygen storage amount OSA does not reach the maximum storable oxygen amount Cmax even if unintentional deviation in air-fuel ratio due to abrupt acceleration of the vehicle occurs. For example, the switching reference storage amount Cref is made ¾ or less of the maximum storable oxygen amount Cmax when the upstream side exhaust purification catalyst 20 is not in use, preferably ½ or less thereof. As a result, the air-fuel ratio correction amount AFC is switched to the rich set correction amount AFCrich before the output air-fuel ratio AFdown of the downstream side air-fuel ratio sensor 41 reaches a lean judged air-fuel ratio which is slightly leaner than the stoichiometric air-fuel ratio (for example, 14.65, a lean air-fuel ration wherein the difference from the stoichiometric air-fuel ratio is almost the same as the difference between the rich judged air-fuel ratio and the stoichiometric air-fuel ratio).

At the time $t_2$, if the target air-fuel ratio is switched to the rich set air-fuel ratio, the air-fuel ratio of the exhaust gas flowing into the upstream side exhaust purification catalyst 20 changes from the lean air-fuel ratio to the rich air-fuel ratio. Since, the exhaust gas flowing into the upstream side exhaust purification catalyst 20 contains unburned gas, the upstream side exhaust purification catalyst 20 gradually decreases in oxygen storage amount OSA. At this time, $NO_x$ amount exhausted from the upstream side exhaust purification catalyst 20 is substantially zero.

The oxygen storage amount OSA of the upstream side exhaust purification catalyst 20 gradually decreases, and at the time $t_3$, in a similar way to time $t_1$, the output air-fuel ratio AFdwn of the downstream side air-fuel ratio sensor 41 reaches the rich judged air-fuel ratio AFrich. Due to this, the air-fuel ratio correction amount AFC is switched to the lean set correction amount AFClean. Then, the cycle of the above mentioned times $t_1$ to $t_3$ is repeated.

As will be understood from the above explanation, according to the present embodiment, it is possible to constantly suppress the amount of exhaust of $NO_x$ from the upstream side exhaust purification catalyst 20. That is, so long as performing the above-mentioned control, basically, it is possible to make the amount of exhaust of $NO_x$ from the upstream side exhaust purification catalyst 20 substantially zero. Further, the cumulative time period when calculating the cumulative oxygen excess/deficiency is short, therefore compared with the case of cumulatively adding the values over a long time period, error in calculation is kept from occurring. For this reason, error in calculation of the cumulative oxygen excess/deficiency is kept from causing the $NO_x$ to end up being exhausted.

Note that, in the present embodiment, the air-fuel ratio correction amount AFC is set, that is, the target air-fuel ratio is set, by the ECU 31 functioning as a control system. Therefore, the ECU 31 can be said to continuously or intermittently set the target air-fuel ratio of the exhaust gas flowing into the upstream side exhaust purification catalyst 20 to a lean air-fuel ratio until the oxygen storage amount OSA of the upstream side exhaust purification catalyst 20 is estimated to have become the switching reference storage amount Cref or more when the air-fuel ratio of exhaust gas detected by the downstream side air-fuel ratio sensor 41 becomes the rich judged air-fuel ratio or less and to continuously or intermittently set the target air-fuel ratio to a rich air-fuel ratio until the air-fuel ratio of exhaust gas detected by the downstream side air-fuel ratio sensor 41 becomes a rich judged air-fuel ratio or less without the oxygen storage amount OSA reaching the maximum storable oxygen amount Cmax when the oxygen storage amount OSA of the upstream side exhaust purification catalyst 20 is estimated to have become the switching reference storage amount Cref or more.

More simply speaking, in the present embodiment, the air-fuel ratio control part of the ECU 31 can be said to switch the target air-fuel ratio (that is, the air-fuel ratio of the exhaust gas flowing into the upstream side exhaust purification catalyst 20) to the lean air-fuel ratio when the air-fuel ratio detected by the downstream side air-fuel ratio sensor 41 becomes the rich judged air-fuel ratio or less and to switch the target air-fuel ratio (that is, the air-fuel ratio of the exhaust gas flowing into the upstream side exhaust purification catalyst 20) to the rich air-fuel ratio when the oxygen storage amount OSA of the upstream side exhaust purification catalyst 20 becomes the switching reference storage amount Cref or more.

Occurrence of Scavenging

In this regard, as explained above, the internal combustion engine 100 of the present embodiment comprises the variable valve timing mechanism B able to control the opening timing and closing timing of the intake valve 6 and the variable valve timing mechanism C able to control the opening timing and closing timing of the exhaust valve 8. For this reason, the opening period of the intake valve 6 and the opening period of the exhaust valve 8 can partially overlap, that is, valve overlap of these intake valve 6 and exhaust valve 8 can be caused.

Figure 5A:
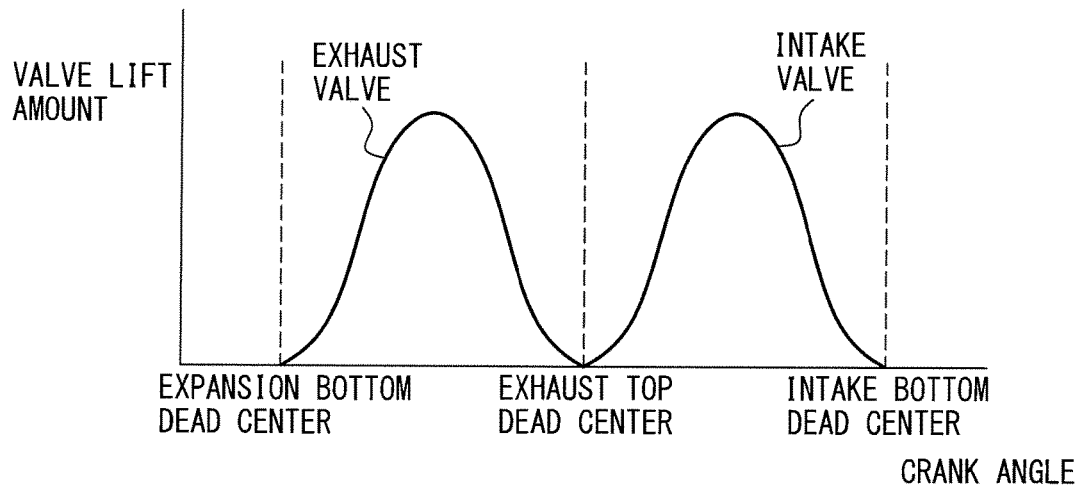
FIG. 5A is a view showing changes in the amounts of lift of the intake valve and exhaust valve with respect to the crank angle.
Figure 5B:
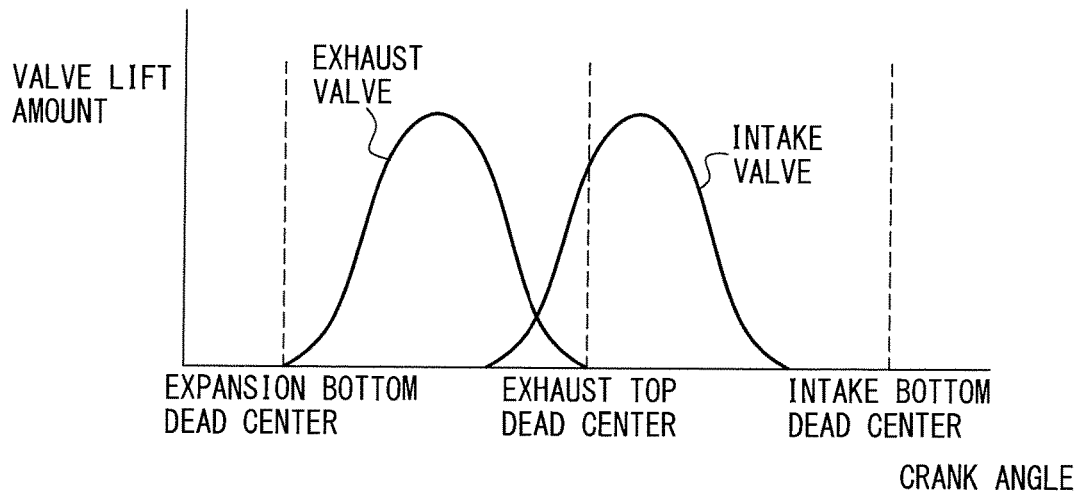
FIG. 5B is a view showing changes in the amounts of lift of the intake valve and exhaust valve with respect to the crank angle.

FIGS. 5A and 5B show the change in the amounts of lift of the intake valve 6 and exhaust valve 8 with respect to the crank angle. In the example shown in FIG. 5A, the closing timing of the exhaust valve 8 and the opening timing of the intake valve 6 both match at exhaust top dead center. For this reason, the opening period of the intake valve 6 and the opening period of the exhaust valve 8 do not overlap and therefore valve overlap does not occur. On the other hand, in the example shown in FIG. 5B, the opening timing of the intake valve 6 is earlier than the closing timing of the exhaust valve 8. For this reason, the opening period of the intake valve 6 and the opening period of the exhaust valve 8 partially overlap, that is, valve overlap occurs.

Note that, in the example shown in FIG. 5, the case is shown where the variable valve timing mechanism B of the intake valve 6 is used to control the opening timing of the intake valve 6 or the opening period of the intake valve 6 and thereby the presence of valve overlap or the amount of valve overlap is made to change. However, the presence of valve overlap or the amount of valve overlap may be changed by controlling not the opening timing of the intake valve 6 or the opening period of the intake valve 6 or in addition to this, but the closing timing of the exhaust valve 8 or the opening period of the exhaust valve 8 using the variable valve timing mechanism C of the exhaust valve 8.

In this way, if valve overlap occurs, when the pressure inside the intake port 7 (intake pressure) is higher than the pressure inside the exhaust port 9 (exhaust pressure), air is blown from the intake passage through the inside of the cylinder to the exhaust passage as a "scavenging" action. This scavenging is, for example, used for the case where the amount of intake air is deficient for the demanded torque. If forcibly causing scavenging, it is possible to increase the amount of flow of the exhaust gas and, as a result, to increase the speed of the turbine 102 of the exhaust turbocharger 101. Due to this, the pressure of the intake air (supercharging pressure) is raised, the amount of intake air is made to increase, and as a result the deficiency in the amount of intake air can be eliminated.

Output Air-Fuel Ratio at Time of Scavenging

In the present embodiment, even if scavenging occurs, the above-mentioned air-fuel ratio control is performed. Therefore, even if scavenging occurs, feedback control is performed so that the air-fuel ratio of the exhaust gas flowing into the upstream side exhaust purification catalyst 20 becomes the target air-fuel ratio. Here, during scavenging, part of the air is blown from the intake passage to the exhaust passage, so the air-fuel ratio of the air-fuel mixture when burned inside the combustion chamber 5 (below, referred to as the "combustion air-fuel ratio") is made an air-fuel ratio richer than the target air-fuel ratio. At this time, the combustion air-fuel ratio is set so that the total air-fuel ratio of the exhaust gas, combining the exhaust gas discharged from the combustion chamber 5 after combustion and exhaust gas (air) blown through by scavenging, becomes the target air-fuel ratio.

The output air-fuel ratio of the upstream side air-fuel ratio sensor 40 basically expresses the average air-fuel ratio of all of the exhaust gas, combining the exhaust gas discharged from the combustion chamber after combustion and exhaust gas (air) blown through by scavenging. For this reason, basically even if scavenging occurs, in air-fuel ratio control, the amount of fuel injection of the fuel injector 11 is controlled by feedback so that the output air-fuel ratio of the upstream side air-fuel ratio sensor 40 becomes the target air-fuel ratio.

In this regard, it is confirmed that when scavenging occurs, the output air-fuel ratio of the upstream side air-fuel ratio sensor 40 deviates to the rich side from the actual air-fuel ratio. In this way, deviation is believed to occur in the output air-fuel ratio of the upstream side air-fuel ratio sensor 40 for the following reason.

That is, when scavenging occurs, the combustion air-fuel ratio is made an air-fuel ratio richer than the target air-fuel ratio. For this reason, basically, the combustion air-fuel ratio becomes a rich air-fuel ratio richer than the stoichiometric air-fuel ratio and therefore the exhaust gas discharged from the combustion chamber 5 after combustion contains a large amount of unburned gas. On the other hand, due to scavenging, the exhaust gas blown from the intake passage to the exhaust passage is basically air, so contains a large amount of oxygen. Therefore, the exhaust gas exhausted from the engine body 1 contains a large amount of unburned gas and a large amount of oxygen even if its air-fuel ratio is the stoichiometric air-fuel ratio.

Here, unburned gas contains hydrogen. Hydrogen more easily passes through a diffusion regulating layer provided at the air-fuel ratio sensor compared with the unburned HC or oxygen or other components of the exhaust gas. For this reason, for example, when the equivalent ratio of unburned HC, CO and oxygen contained in the exhaust gas is 1:1, there is not that great a difference in the diffusion speeds of these ingredients, so the output air-fuel ratio of the air-fuel ratio sensor becomes substantially the stoichiometric air-fuel ratio. As opposed to this, when the equivalent ratio of unburned HC, CO and hydrogen, and oxygen contained in the exhaust gas is 1:1, since among these only hydrogen is fast in diffusion speed, there is a large amount of hydrogen around the exhaust side electrode of the air-fuel ratio sensor. If, as a result, the exhaust gas contains a large amount of hydrogen, the output air-fuel ratio of the air-fuel ratio sensor ends up deviating to the rich side. As explained above, when scavenging occurs, the exhaust gas discharged from the engine body 1 contains a large amount of unburned gas and accordingly contains a large amount of hydrogen. For this reason, when scavenging occurs, the output air-fuel ratio of the upstream side air-fuel ratio sensor 40 ends up deviating to the rich side from the actual air-fuel ratio.

Figure 6:
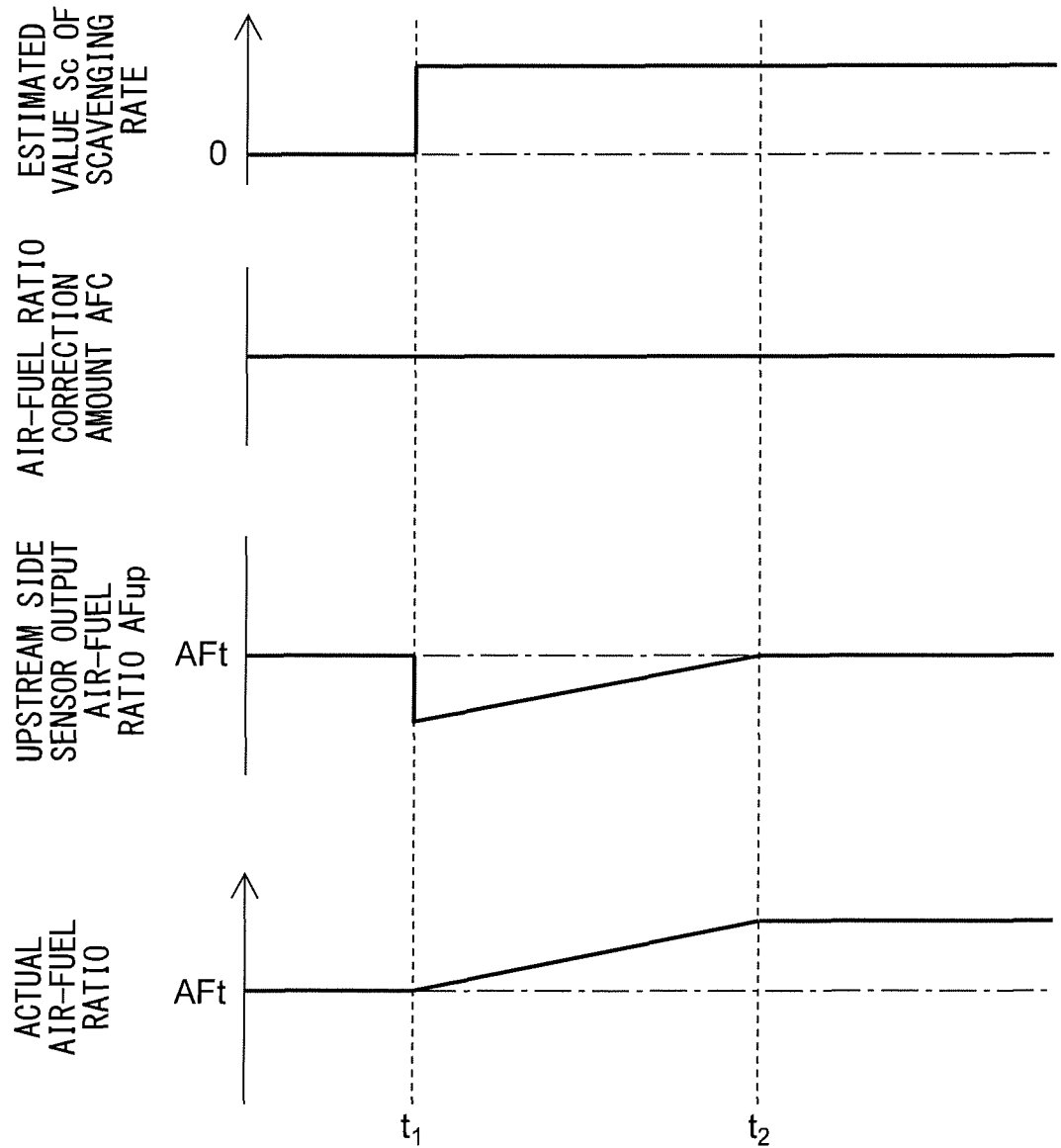
FIG. 6 is a time chart of an estimated value of the scavenging rate etc. when the occurrence of scavenging causes deviation in the output air-fuel ratio of the upstream side air-fuel ratio sensor.

FIG. 6 is a time chart of the estimated value Sc of the scavenging rate, air-fuel ratio correction amount AFC, output air-fuel ratio AFup of the upstream side air-fuel ratio sensor 40, and actual air-fuel ratio of the exhaust gas flowing around the upstream side air-fuel ratio sensor 40 when the occurrence of scavenging causes deviation in the output air-fuel ratio of the upstream side air-fuel ratio sensor 40. The scavenging rate shows the ratio of the amount of scavenging to the amount of intake air and is estimated from the amount of valve overlap, pressure inside the intake passage, engine speed, etc.

In the example shown in FIG. 6, before the time $t_1$, scavenging does not occur. Therefore, the estimated value Sc of the scavenging rate becomes "0". At this time, the output air-fuel ratio AFup of the upstream side air-fuel ratio sensor 40 matches the target air-fuel ratio AFt. At this time, there is no deviation in the output air-fuel ratio AFup of the upstream side air-fuel ratio sensor 40, so the exhaust gas flowing around the upstream side air-fuel ratio sensor 40, that is, the air-fuel ratio of the exhaust gas flowing into the upstream side exhaust purification catalyst 20, also matches the target air-fuel ratio AFt.

After this, in the example shown in FIG. 6, at the time $t_1$, by controlling the opening timing of the intake valve 6 or the closing timing of the exhaust valve 8, scavenging is caused. In particular, FIG. 6, for ease of understanding of the explanation, shows the case where the scavenging rate is made to rise step-wise at the time $t_1$. On the other hand, at the time $t_1$, the air-fuel ratio correction amount AFC is maintained without changing and accordingly the target air-fuel ratio is maintained constant as is without changing before and after the time $t_1$.

In this way, if, at the time $t_1$, making the scavenging rate rise step-wise, along with this, the output air-fuel ratio AFup of the upstream side air-fuel ratio sensor 40 deviates to the rich side step-wise. On the other hand, at the time $t_1$, deviation just occurred in the output air-fuel ratio AFup of the upstream side air-fuel ratio sensor 40, so the actual air-fuel ratio of the exhaust gas is maintained constant as is without fluctuating.

However, as explained above, in the air-fuel ratio control of the present embodiment, feedback control is performed for controlling the amount of fuel injection from the fuel injector 11 so that the output air-fuel ratio AFup of the upstream side air-fuel ratio sensor 40 becomes the target air-fuel ratio AFt. As explained above, at the time $t_1$, the output air-fuel ratio AFup of the upstream side air-fuel ratio sensor 40 is an air-fuel ratio at the rich side from the target air-fuel ratio AFt, so due to feedback control, the amount of fuel injection from the fuel injector 11 is made to decrease. As a result, the air-fuel ratio of the exhaust gas discharged from the engine body 1 gradually changes to the lean side. Along with this, the output air-fuel ratio of the upstream side air-fuel ratio sensor 40 gradually approaches the target air-fuel ratio. However, at this time, as will be understood from FIG. 6, the actual air-fuel ratio of the exhaust gas flowing around the upstream side air-fuel ratio sensor 40 gradually deviates from the target air-fuel ratio Aft to the lean side.

In the example shown in FIG. 6, as a result of feedback control, at the time $t_2$, the output air-fuel ratio AFup of the upstream side air-fuel ratio sensor 40 reaches the target air-fuel ratio. At this time, the actual air-fuel ratio of the exhaust gas flowing around the upstream side air-fuel ratio sensor 40 deviates to the lean side by for example the amount of deviation at the output air-fuel ratio AFup of the upstream side air-fuel ratio sensor 40.

Countermeasures Against Deviation of Air-Fuel Ratio Sensor

Therefore, in the present embodiment, the output air-fuel ratio AFup of the upstream side air-fuel ratio sensor 40 is corrected in accordance with the scavenging rate. Below, correction value of the output air-fuel ratio AFup of the upstream side air-fuel ratio sensor 40 (below, also referred to as the "output correction value") will be explained.

Figure 7A:
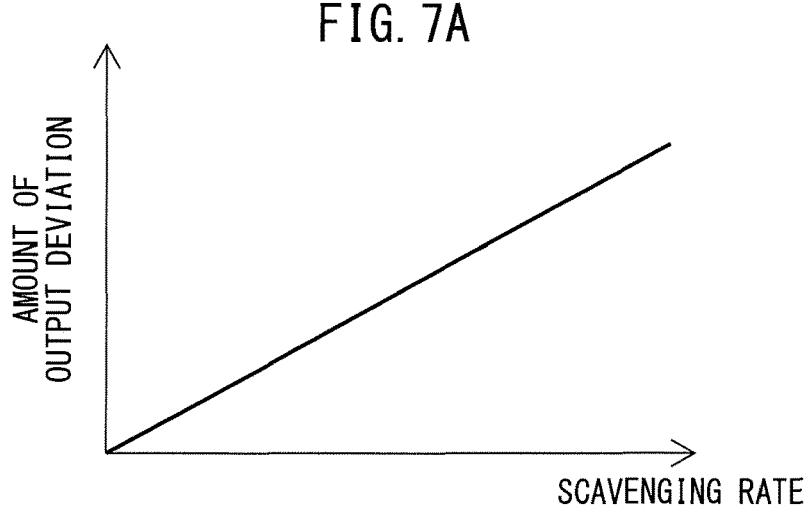
FIG. 7A is a view showing the relationship between a scavenging rate or its estimated value and an amount of output deviation or an output correction value.

Here, FIG. 7A is a view showing the relationship between the scavenging rate and the amount of deviation to the rich side occurring in the output air-fuel ratio AFup of the upstream side air-fuel ratio sensor 40. As will be understood from FIG. 7A, the amount of deviation occurring in the output air-fuel ratio AFup of the upstream side air-fuel ratio sensor 40 becomes larger the larger the scavenging rate. Due to such a relationship between deviation and the scavenging rate, it is possible to calculate the amount of deviation expected to occur in the output air-fuel ratio AFup of the upstream side air-fuel ratio sensor 40 based on the scavenging rate.

In this regard, the scavenging rate, as explained above, is estimated based on, for example, the amount of valve overlap, pressure inside the exhaust passage, engine speed, etc. However, the amount of air blown from the exhaust passage to the intake passage is not directly detected, so the estimated value of the scavenging rate ends up including a certain degree of error. This situation is shown in FIG. 7B.

Figure 7B:
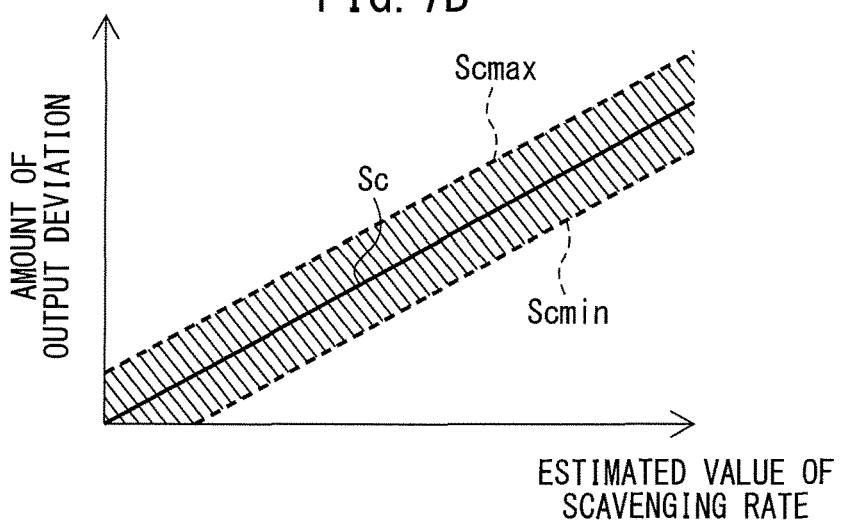
FIG. 7B is a view showing the relationship between a scavenging rate or its estimated value and an amount of output deviation or an output correction value.

FIG. 7B is a view showing the relationship between the estimated value of the scavenging rate and the amount of deviation to the rich side in the output air-fuel ratio of the upstream side air-fuel ratio sensor 40. In FIG. 7B, the solid line Sc shows the relationship between the estimated value of the scavenging rate and the amount of deviation in the case where there is no error in the estimated value of the scavenging rate (same as FIG. 7A). Therefore, the amount of deviation of the output air-fuel ratio at the solid line of FIG. 7B can be called the "deviation expected to occur in the upstream side air-fuel ratio sensor 40 due to the occurrence of scavenging".

On the other hand, Scmax shows the relationship between the estimated value of the scavenging rate and the amount of deviation when the maximum extent of error in the direction of decrease with respect to the actual scavenging rate (below, referred to as the "maximum error in the direction of decrease") occurs in the estimated value of the scavenging rate. That is, the error able to occur in the estimated value of the scavenging rate can be found in advance to a certain degree by experiments or calculations, but Scmax shows the relationship in the case where an error occurs in a direction whereby the scavenging rate becomes the smallest. On the other hand, Scmin shows the relationship between the estimated value of the scavenging rate and the amount of deviation when the maximum extent of error in the direction of increase with respect to the actual scavenging rate (below, referred to as the "maximum error in the direction of increase") occurs in the estimated value of the scavenging rate. That is, the error able to occur in the estimated value of the scavenging rate can be found in advance to a certain degree by experiments or calculations, but Scmin shows the relationship in the case where an error occurs in a direction whereby the scavenging rate becomes the greatest. Therefore, when the estimated value of the scavenging rate is Sc in FIG. 7B, in consideration of the error in the estimated value, the amount of deviation of the output air-fuel ratio of the upstream side air-fuel ratio sensor 40 becomes a value in the range of Scmax and Scmin.

Figure 7C:
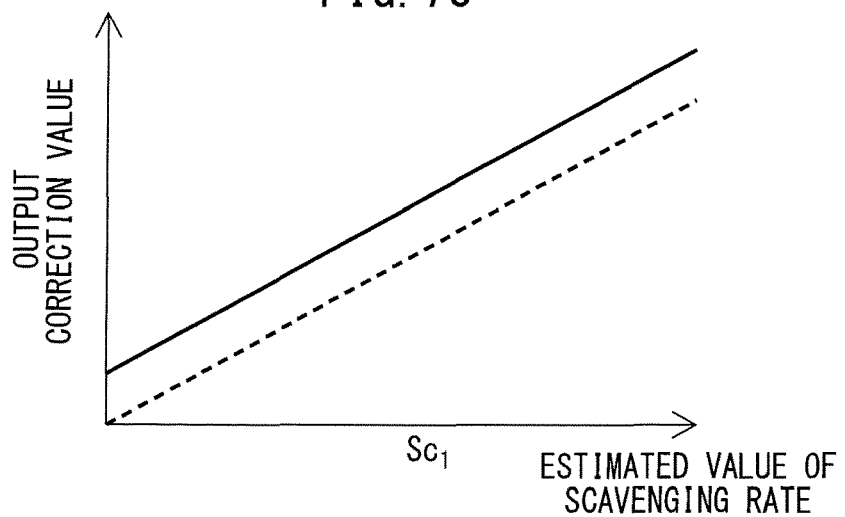
FIG. 7C is a view showing the relationship between a scavenging rate or its estimated value and an amount of output deviation or an output correction value.

FIG. 7C is a view showing the relationship between the estimated value of the scavenging rate and the lean side correction value at the output air-fuel ratio AFup of the upstream side air-fuel ratio sensor 40 (output correction value). In FIG. 7(C), the broken line shows a correction value enabling elimination of the deviation in the output air-fuel ratio AFup in the case where no error occurs in the estimated value of the scavenging rate. Therefore, the absolute value of the output correction value at the broken line of FIG. 7C becomes a value equal to the absolute value of the amount of deviation of the output at FIG. 7A. In other words, the broken line in FIG. 7C shows the output correction value in the case of correcting the output air-fuel ratio of the upstream side air-fuel ratio sensor 40 to the lean side by exactly an amount equal to the amount of deviation expected to occur in the output air-fuel ratio AFup of the upstream side air-fuel ratio sensor 40 due to the occurrence of scavenging.

On the other hand, the solid line of FIG. 7C shows the relationship between the estimated value of the scavenging rate and the output correction value in the present embodiment. In the solid line of FIG. 7C, when the estimated value of the scavenging rate is the same, the output correction value is set so as to become larger than the output correction value at the broken line. Therefore, in the present embodiment, the output air-fuel ratio of the upstream side air-fuel ratio sensor 40 is corrected to the lean side more than the amount of deviation expected to occur in the output air-fuel ratio of the upstream side air-fuel ratio sensor due to the occurrence of scavenging.

In particular, in the present embodiment, the absolute value of the output correction value at the solid line of FIG. 7C becomes a value equal to the absolute value of the amount deviation of output at the broken line Scmax of FIG. 7(B). Therefore, in the present embodiment, the output correction value can be set to a correction value eliminating the deviation occurring in the output air-fuel ratio AFup of the upstream side air-fuel ratio sensor 40 without excess or deficiency if maximum error in the direction of decrease occurs in the estimated value of the scavenging rate.

Figure 8:
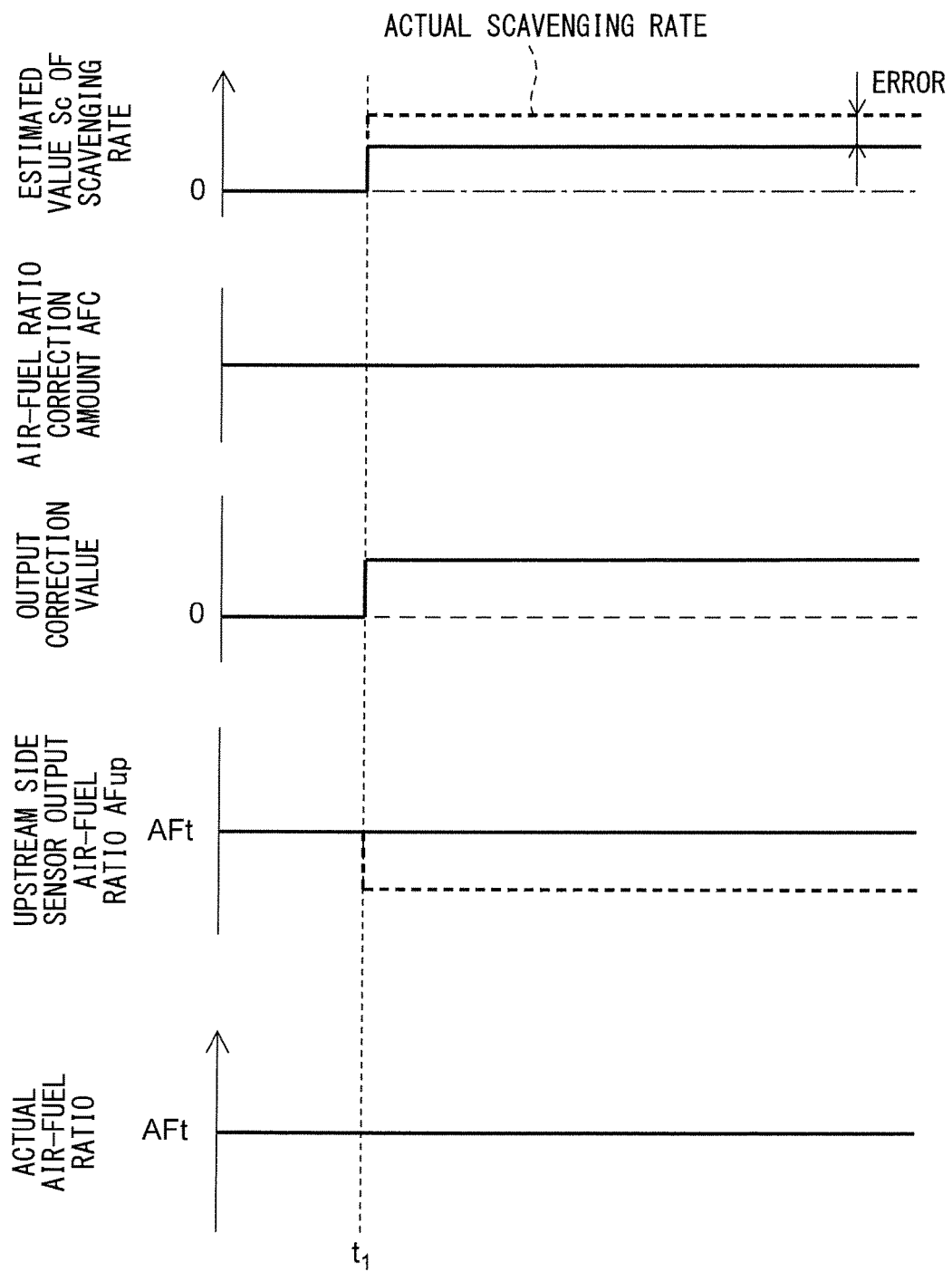
FIG. 8 is a time chart of an estimated value of the scavenging rate etc. when a large error occurs in the estimated value of the scavenging rate.

FIG. 8 is a time chart of the estimated value Sc of the scavenging rate, air-fuel ratio correction amount AFC, output correction value, output air-fuel ratio AFup of the upstream side air-fuel ratio sensor 40, and actual air-fuel ratio of the exhaust gas flowing around the upstream side air-fuel ratio sensor 40. FIG. 8 shows the trends in the case where a large error occurs in the estimated value Sc of the scavenging rate (maximum error in direction of decrease). Note that, the broken line at the output air-fuel ratio AFup of the upstream side air-fuel ratio sensor 40 shows the value in the case of no correction of the output air-fuel ratio, while the solid line at the output air-fuel ratio AFup shows the value after correction by addition of the output correction value. Further, the broken line at the estimated value Sc of the scavenging rate shows the actual scavenging rate.

In the example shown in FIG. 8, before the time $t_1$, scavenging does not occur. Therefore, at this time, deviation does not occur in the output air-fuel ratio AFup of the upstream side air-fuel ratio sensor 40, so the actual air-fuel ratio of the exhaust gas flowing around the upstream side air-fuel ratio sensor 40 matches its output air-fuel ratio. In the example shown in FIG. 8, before the time $t_1$, the actual air-fuel ratio of the exhaust gas flowing around the upstream side air-fuel ratio sensor 40 and the output air-fuel ratio of the upstream side air-fuel ratio sensor 40 both match the target air-fuel ratio.

After this, at the time $t_1$, scavenging is caused. In the example shown in FIG. 8 as well, for ease of understanding of the explanation, at the time $t_1$, the scavenging rate is made to rise in a step-wise manner. Note that, in the example shown in FIG. 8, a large error occurs in the estimated value Sc of the scavenging rate. The actual scavenging rate becomes a value larger than the estimated value Sc.

On the other hand, in the present embodiment, as explained above, based on the estimated value Sc of the scavenging rate, the output air-fuel ratio of the upstream side air-fuel ratio sensor 40 is corrected to the lean side. For this reason, at the time $t_1$ when the estimated value Sc of the scavenging rate increases, along with this, the output correction value is made to increase.

Further, the output air-fuel ratio AFup of the upstream side air-fuel ratio sensor 40 falls along with the rise of the scavenging rate (broken line at the figure). However, as explained above, at the time $t_1$, the output correction value is made to increase. In particular, the output correction value is set so that the output air-fuel ratio AFup matches the actual air-fuel ratio when the maximum error in the direction of decrease occurs in the estimated value Sc of the scavenging rate. On the other hand, in the example shown in FIG. 8, a large error occurs in the estimated value Sc of the scavenging rate in a direction reducing the actual scavenging rate. For this reason, in the example shown in FIG. 8, the output air-fuel ratio AFup corrected in a lean direction by exactly the amount of the output correction value matches the actual air-fuel ratio.

Figure 9:
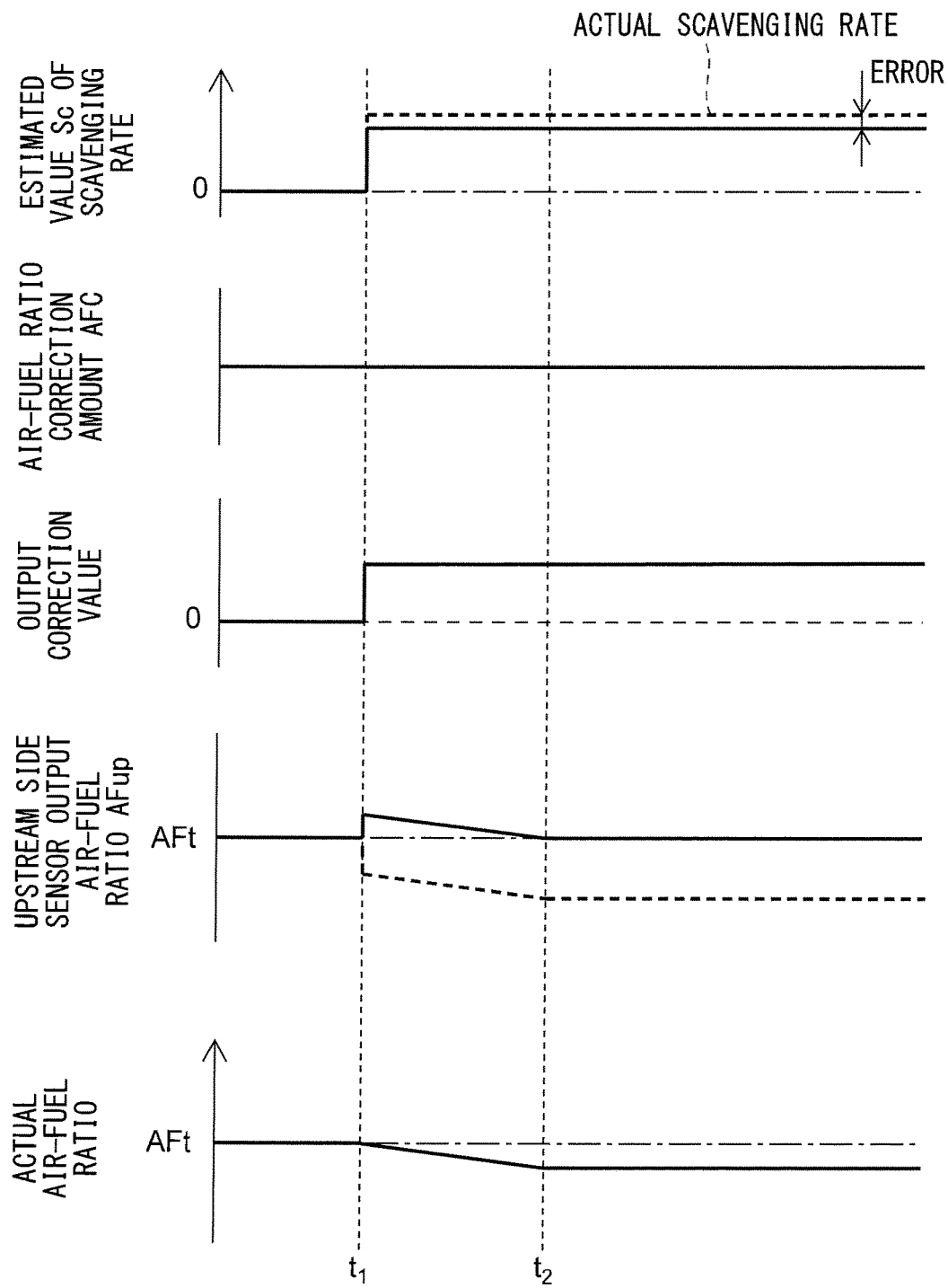
FIG. 9 is a time chart of an estimated value of the scavenging rate etc. when not that large an error occurs in the estimated value of the scavenging rate.

FIG. 9 is also a time chart similar to FIG. 8 showing the estimated value Sc of the scavenging rate etc. FIG. 9 shows the trends in the different parameters in the case where not that large an error occurs in the estimated value Sc of the scavenging rate. In FIG. 9 as well, the broken line at the output air-fuel ratio AFup of the upstream side air-fuel ratio sensor 40 shows the value in the case of no correction of the output air-fuel ratio AFup, while the solid line at the output air-fuel ratio AFup shows the value after correction by adding the output correction value. Further, the broken line at the estimated value Sc of the scavenging rate shows the actual scavenging rate.

In the example shown in FIG. 9 as well, before the time $t_1$, scavenging does not occur. At the time $t_1$, scavenging is caused. Error in the direction of decrease occurs in the estimated value Sc of the scavenging rate at this time, but the error is smaller than the example shown in FIG. 8. Further, at the time $t_1$ when the estimated value Sc of the scavenging rate increases, along with this, the output correction value is made to increase.

Here, the output air-fuel ratio AFup of the upstream side air-fuel ratio sensor 40, at the time $t_1$, falls along with a rise of the scavenging rate (broken line at the figure). On the other hand, at the time $t_1$, the output correction value is made to increase and the output air-fuel ratio AFup of the upstream side air-fuel ratio sensor 40 is corrected to the lean side by that amount. Here, in the example shown in FIG. 9, a slight error occurs in the direction of decrease in the estimated value Sc of the scavenging rate. As opposed to this, the output correction value is set envisioning the case of the maximum error in the direction of decrease occurring in the estimated value Sc of the scavenging rate. For this reason, when only a slight error occurs in the estimated value Sc of the scavenging rate, the output air-fuel ratio AFup of the upstream side air-fuel ratio sensor 40 ends up being excessively corrected to the lean side. As a result, in the example shown in FIG. 9, at the time $t_1$, the output air-fuel ratio AFup of the upstream side air-fuel ratio sensor 40 changes to the lean side.

As explained above, in the air-fuel ratio control of the present embodiment, feedback control is performed for controlling the amount of fuel injection from the fuel injector 11 so that the output air-fuel ratio of the upstream side air-fuel ratio sensor 40 becomes the target air-fuel ratio. In the example shown in FIG. 9, at the time $t_1$, the output air-fuel ratio of the upstream side air-fuel ratio sensor 40 becomes an air-fuel ratio at the lean side from the target air-fuel ratio, so due to this feedback control, the amount of fuel injection from the fuel injector 11 is made to increase. As a result, the air-fuel ratio of the exhaust gas discharged from the engine body 1 gradually changes to the rich side and, along with this, the output air-fuel ratio AFup of the upstream side air-fuel ratio sensor 40 gradually approaches the target air-fuel ratio. However, at this time, as will be understood from FIG. 9, the actual air-fuel ratio of the exhaust gas flowing around the upstream side air-fuel ratio sensor 40 gradually separates from the target air-fuel ratio Aft to the rich side.

In the example shown in FIG. 9, as a result of the feedback control, at the time $t_2$, the output air-fuel ratio AFup of the upstream side air-fuel ratio sensor 40 reaches the target air-fuel ratio. At this time, the actual air-fuel ratio of the exhaust gas flowing around the upstream side air-fuel ratio sensor 40 deviates to the rich side by exactly the amount of excess correction of the output air-fuel ratio AFup of the upstream side air-fuel ratio sensor 40.

In this way, according to the present embodiment, when scavenging occurs, the output air-fuel ratio AFup of the upstream side air-fuel ratio sensor 40 is corrected to the lean side by more than the amount of deviation expected to occur in the output air-fuel ratio AFup of the upstream side air-fuel ratio sensor 40 due to scavenging. In particular, in the above embodiment, the output correction value is set so that the output air-fuel ratio matches the actual air-fuel ratio when the maximum error in the direction of decrease occurs in the estimated value Sc of the scavenging rate. For this reason, even if some sort of error occurs in the estimated value Sc of the scavenging rate, the actual air-fuel ratio matches the target air-fuel ratio or becomes an air-fuel ratio at the rich side from the target air-fuel ratio. In other words, the actual air-fuel ratio does not become an air-fuel ratio at the lean side from the target air-fuel ratio.

If the actual air-fuel ratio becomes an air-fuel ratio at the lean side from the target air-fuel ratio, the exhaust gas contains excessive $NO_x$ and deterioration of the exhaust emission is invited. As opposed to this, in the present embodiment, even if there is an error in the output air-fuel ratio AFup of the upstream side air-fuel ratio sensor 40, the exhaust gas flowing out from the upstream side exhaust purification catalyst 20 no longer contains excessive $NO_x$. Accordingly, it is possible to suppress deterioration of the exhaust emission. Note that, in the present embodiment, instead of the exhaust gas no longer including excessive $NO_x$, the exhaust gas often contains excessive unburned gas. However, the excessive unburned gas in exhaust gas is more easily removed by the downstream side exhaust purification catalyst 24 compared with excessive $NO_x$, so there is no large problem compared with $NO_x$ even if unburned gas is contained in the exhaust gas flowing out from the upstream side exhaust purification catalyst 20.

Note that, in the above embodiment, the output correction value is set so that the output air-fuel ratio matches the actual air-fuel ratio if the maximum error in the direction of decrease occurs in the estimated value Sc of the scavenging rate. However, the output correction value need not necessarily be set to match with the case where the maximum error in the direction of decrease occurs in the estimated value Sc of the scavenging rate. Therefore, the output correction value may be any value so long as larger than the value matching the case where no error occurs in the estimated value Sc of the scavenging rate and not more than the value matching the case where the maximum error in the direction of decrease occurs in the estimated value Sc of the scavenging rate. In this case as well, so long as the output correction value is set to a value larger than a value matching the case where no error occurs in the estimated value Sc of the scavenging rate, it is possible to lower the possibility of the actual air-fuel ratio becoming an air-fuel ratio at the lean side from the target air-fuel ratio and therefore it is possible to suppress deterioration of the exhaust emission.

Further, in the above embodiment, the output air-fuel ratio AFup of the upstream side air-fuel ratio sensor 40 is corrected. However, what is corrected need not be the output air-fuel ratio AFup of the upstream side air-fuel ratio sensor 40. Here, in the above embodiment, when scavenging occurs, the output air-fuel ratio AFup of the upstream side air-fuel ratio sensor 40 is corrected to the lean side more than the amount of deviation expected to occur in the output air-fuel ratio AFup of the upstream side air-fuel ratio sensor 40 due to the occurrence of scavenging. If correcting the output air-fuel ratio AFup to the lean side, as a result, due to the above-mentioned feedback control, the air-fuel ratio of the exhaust gas flowing into the upstream side exhaust purification catalyst 20 changes to the rich side. Therefore, in the above embodiment, it is possible to say that when scavenging occurs, the air-fuel ratio of the exhaust gas flowing into the upstream side exhaust purification catalyst 20 is made to change to the rich side more than the amount of deviation expected to occur in the output air-fuel ratio AFup of the upstream side air-fuel ratio sensor 40 due to scavenging.

Therefore, what is corrected is a parameter relating to the air-fuel ratio of the exhaust gas flowing into the upstream side exhaust purification catalyst 20. Any parameter may be corrected so long as a parameter enables the air-fuel ratio of the exhaust gas flowing into the upstream side exhaust purification catalyst 20 to be changed to the rich side more than the amount of deviation expected to occur in the output air-fuel ratio AFup of the upstream side air-fuel ratio sensor 40 due to the occurrence of scavenging. In this case, if considering FIG. 7C, a parameter relating to the air-fuel ratio of the exhaust gas flowing into the upstream side exhaust purification catalyst 20 is corrected so that the higher the scavenging rate, the more to the rich side the air-fuel ratio of the exhaust gas flowing into the upstream side exhaust purification catalyst 20 is changed. Note that, specifically, as a parameter for correction, instead of the output air-fuel ratio of the upstream side air-fuel ratio sensor 40, the control center air-fuel ratio, air-fuel ratio correction amount, target air-fuel ratio, amount of feed of fuel from the fuel injector 11, etc. may be mentioned.

Problem Accompanying Correction of Output Air-Fuel Ratio

As shown in FIG. 9, when the error in the estimated value Sc of the scavenging rate is not that large, the output air-fuel ratio AFup of the upstream side air-fuel ratio sensor 40 is excessively corrected and, as a result, the actual air-fuel ratio of the exhaust gas flowing into the upstream side exhaust purification catalyst 20 becomes an air-fuel ratio at the rich side from the target air-fuel ratio.

As explained referring to FIG. 4, in the present embodiment, the target air-fuel ratio is repeatedly set to a rich air-fuel ratio and a lean air-fuel ratio. As opposed to this, if the actual air-fuel ratio becomes an air-fuel ratio at the rich side from the target air-fuel ratio, despite the target air-fuel ratio being set to the lean air-fuel ratio, sometimes the actual air-fuel ratio ends up becoming the stoichiometric air-fuel ratio or rich air-fuel ratio.

Further, when performing the air-fuel ratio control shown in FIG. 4, near the time $t_1$ or near the time $t_3$, exhaust gas of a rich air-fuel ratio flows out from the upstream side exhaust purification catalyst 20. At this time, if the actual air-fuel ratio of the exhaust gas flowing into the upstream side exhaust purification catalyst 20 before the time $t_1$ or before the time $t_3$ is an air-fuel ratio richer than the target air-fuel ratio, near the time $t_1$ or near the time $t_3$, the amount of unburned gas flowing out from the upstream side exhaust purification catalyst 20 increases. However, the amount of unburned gas flowing out from the upstream side exhaust purification catalyst 20 is also preferably small.

Control of Air-Fuel Ratio at Time of Occurrence of Scavenging

Therefore, in the present embodiment, when scavenging occurs, compared with when scavenging does not occur, the lean degree of the target air-fuel ratio when setting the target air-fuel ratio to the lean air-fuel ratio is made larger. In addition, when scavenging occurs, compared with when scavenging does not occur, the above-mentioned switching reference storage amount Cref is made to increase.

Figure 10A:
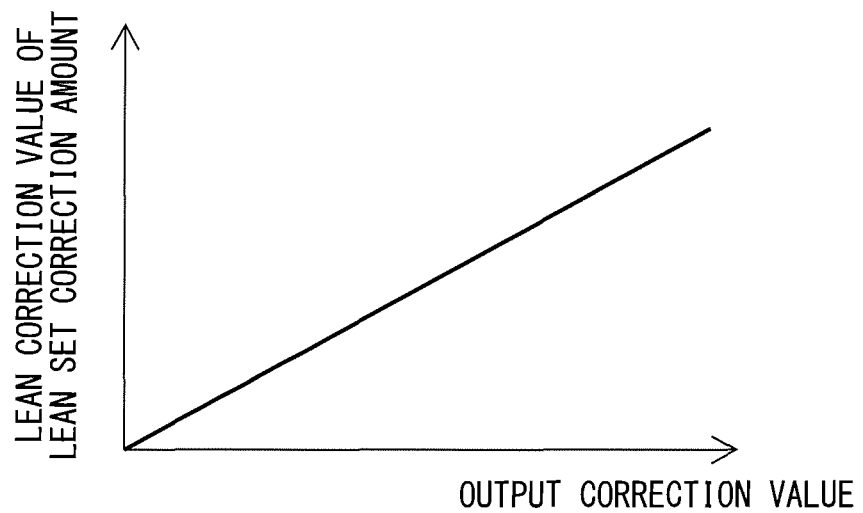
FIG. 10A is a view showing the relationship between an output correction value and the lean side correction value of the lean set correction amount.

Specifically, in the present embodiment, the correction value for correcting the lean set correction amount AFClean to the lean side is changed in accordance with the output correction value. FIG. 10A shows the relationship between the output correction value and the correction value to the lean side of the lean set correction amount AFClean. As will be understood from FIG. 10A, the correction amount to the lean side of the lean set correction amount AFClean becomes larger the larger the output correction value. As a result, the larger the output correction value, that is, the higher the scavenging rate, the greater the lean degree of the lean set air-fuel ratio is made.

Figure 10B:
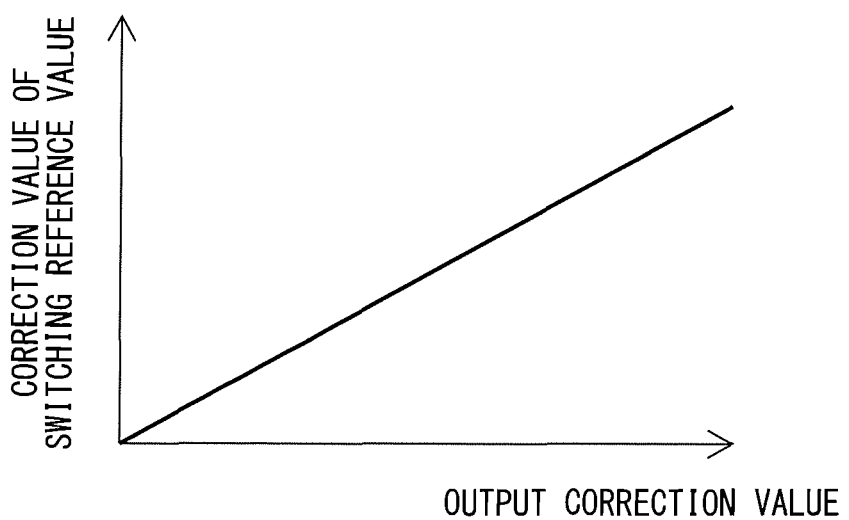
FIG. 10B is a view showing the relationship between an output correction value and a correction amount added to the switching reference storage amount.

Further, in the present embodiment, the switching reference storage amount Cref is changed in accordance with the output correction amount. FIG. 10B shows the relationship between the output correction value and the correction amount added to the switching reference storage amount Cref. As will be understood from FIG. 10B, the correction amount added to the switching reference storage amount Cref becomes larger the larger the output correction value. As a result, the larger the output correction value, that is, the higher the scavenging rate, the more the switching reference storage amount Cref is made to increase.

Figure 11:
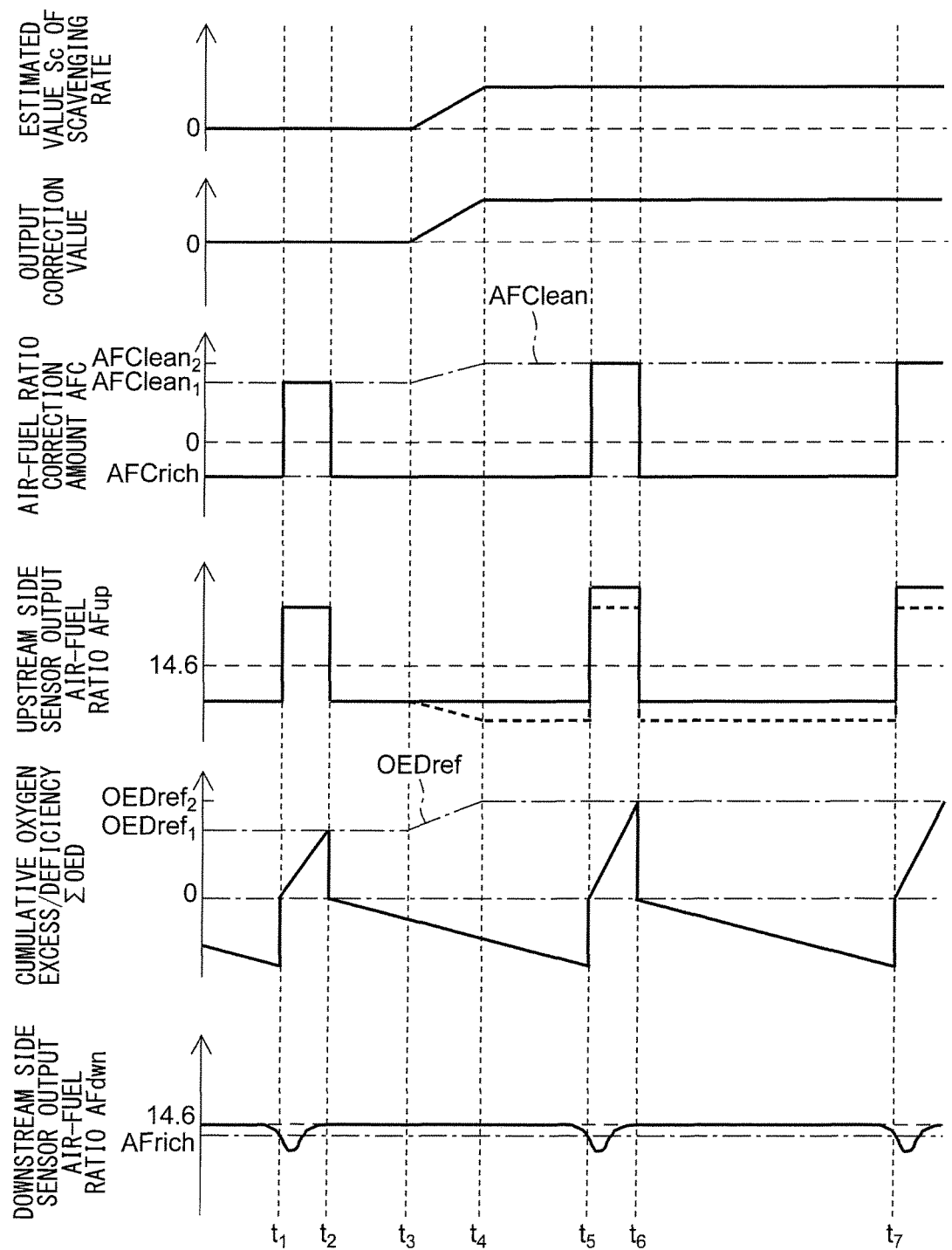
FIG. 11 is a time chart of an estimated value of the scavenging rate etc. at the time of occurrence of scavenging.

FIG. 11 is a time chart of the estimated value Sc of the scavenging rate, correction value to the lean side of the output air-fuel ratio of the upstream side air-fuel ratio sensor 40 (output correction value), air-fuel ratio correction amount AFC, output air-fuel ratio AFup of the upstream side air-fuel ratio sensor 40, cumulative oxygen excess/deficiency ΣOED, and output air-fuel ratio AFdwn of the downstream side air-fuel ratio sensor 41. In particular, FIG. 11 shows the trends in the different parameters at the time of occurrence of scavenging. Note that, the broken line at the output air-fuel ratio AFup of the upstream side air-fuel ratio sensor 40 shows the actual air-fuel ratio of the exhaust gas flowing around the upstream side air-fuel ratio sensor 40.

As shown in FIG. 11, before the time $t_3$, the estimated value Sc of the scavenging rate becomes zero and scavenging occurs. For this reason, before the time $t_3$, similar control to the control shown in FIG. 4 is performed. Specifically, at the time $t_1$, if the output air-fuel ratio AFdwn of the downstream side air-fuel ratio sensor 41 becomes the rich judged air-fuel ratio or less, the air-fuel ratio correction amount AFC is switched to the lean set correction amount AFClean. The lean set correction amount AFClean at this time is set to the first lean set correction amount AFClean$_1$. On the other hand, at the time $t_2$, if the cumulative oxygen excess/deficiency ΣOED reaches the switching reference value OEDref, that is, the estimated value of the oxygen storage amount OSA of the upstream side exhaust purification catalyst 20 reaches the switching reference storage amount Cref, the air-fuel ratio correction amount AFC is switched to the rich set correction amount AFCrich. The switching reference value OEDref at this time is set to the first switching reference value OEDref$_1$. Accordingly, the switching reference storage amount Cref is set to the first switching reference storage amount.

In the example shown in FIG. 11, at the time $t_3$ and on, the opening timing of the intake valve 6, closing timing of the exhaust valve 8, etc. are controlled so that scavenging occurs. Due to this, at the time $t_3$ and on, the estimated value Sc of the scavenging rate gradually increases. Further, along with this, based on the relationship shown in FIG. 7C, the output correction value for the output air-fuel ratio AFup of the upstream side air-fuel ratio sensor 40 is gradually made to increase. Here, in the example shown in FIG. 11, not that large an error occurs in the estimated value Sc of the scavenging rate. For this reason, the output air-fuel ratio AFup of the upstream side air-fuel ratio sensor 40 is excessively corrected to the lean side. As a result, as shown by the broken line in FIG. 11, along with the increase in the output correction value, the actual air-fuel ratio gradually changes to the rich side. For this reason, at the time $t_3$ and on, the actual air-fuel ratio of the exhaust gas becomes an air-fuel ratio to the rich side from the target air-fuel ratio.

In addition, in the present embodiment, at the time $t_3$ and on, along with the rise of the output correction value, the lean set correction amount AFClean is made to increase. Further, along with the rise of the output correction value, the switching reference value OEDref is made to increase and therefore the switching reference storage amount Cref is made to increase.

After this, in the example shown in FIG. 11, at the time $t_4$, the rise of the estimated value Sc of the scavenging rate stops and, at the time $t_4$ and on, the estimated value Sc of the scavenging rate is maintained at a constant value. Along with this, the output correction value is also maintained constant at the time $t_4$ and on. In addition, at the time $t_4$ and on, the lean set correction amount AFClean is also maintained at a constant second lean set correction amount AFClean$_2$. Further, the switching reference value OEDref is also maintained at a constant second switching reference value OEDref$_2$ and therefore the switching reference storage amount Cref is also maintained at a constant second switching reference storage amount Cref$_2$. The second lean set correction amount AFClean$_2$ is larger than the first lean set correction amount AFClean$_1$. Further, the second switching reference value OEDref$_2$ is larger than the first switching reference value OEDref$_1$ and therefore the second switching reference storage amount Cref$_2$ is greater than the first switching reference storage amount Cref$_1$.

As will be understood from FIG. 11, at the time $t_3$ and on as well, the basic air-fuel ratio control shown in FIG. 4 is continued. Therefore, at the time $t_5$, when the output air-fuel ratio AFdwn of the downstream side air-fuel ratio sensor 41 becomes the rich judged air-fuel ratio AFrich or less, the air-fuel ratio correction amount AFC is switched from the rich set correction amount AFCrich to the lean set correction amount AFClean. At this time, the lean set correction amount AFClean is made a value (AFClean$_2$) larger than the value (AFClean$_1$) before the time $t_3$. As a result, the target air-fuel ratio at the time $t_5$ and on is made an air-fuel ratio larger in lean degree than the target air-fuel ratio at the times $t_1$ to $t_2$.

Further, at the time $t_6$ at which the cumulative oxygen excess/deficiency ΣOED from the time $t_5$ reaches the switching reference value OEDref, the air-fuel ratio correction amount AFC is switched from the lean set correction amount AFClean to the rich set correction amount AFCrich. At this time, the switching reference value OEDref is made a value (OEDref$_2$) larger than the value (OEDref$_1$) before the time $t_3$. Here, as explained above, in the example shown in FIG. 11, at the time $t_3$ and on, the output air-fuel ratio AFup of the upstream side air-fuel ratio sensor 40 becomes an air-fuel ratio at the lean side from the actual air-fuel ratio. For this reason, the cumulative oxygen excess/deficiency ΣOED calculated based on the output air-fuel ratio AFup of the upstream side air-fuel ratio sensor 40 is larger than the oxygen storage amount OSA of the upstream side exhaust purification catalyst 20. In the present embodiment, by making the switching reference value OEDref at the time $t_3$ and on larger than the switching reference value OEDref before the time $t_3$, even when scavenging is occurring, it becomes possible to store oxygen in the upstream side exhaust purification catalyst 20 until the actual oxygen storage amount OSA of the upstream side exhaust purification catalyst 20 reaches the original (pre-correction) switching reference storage amount Cref. Therefore, in the present embodiment, even if the scavenging rate fluctuates, the amount of fluctuation of the oxygen storage amount OSA of the upstream side exhaust purification catalyst 20 can be maintained constant.

Flow Chart of Control For Setting Air-Fuel Ratio Correction Amount

Figure 12:
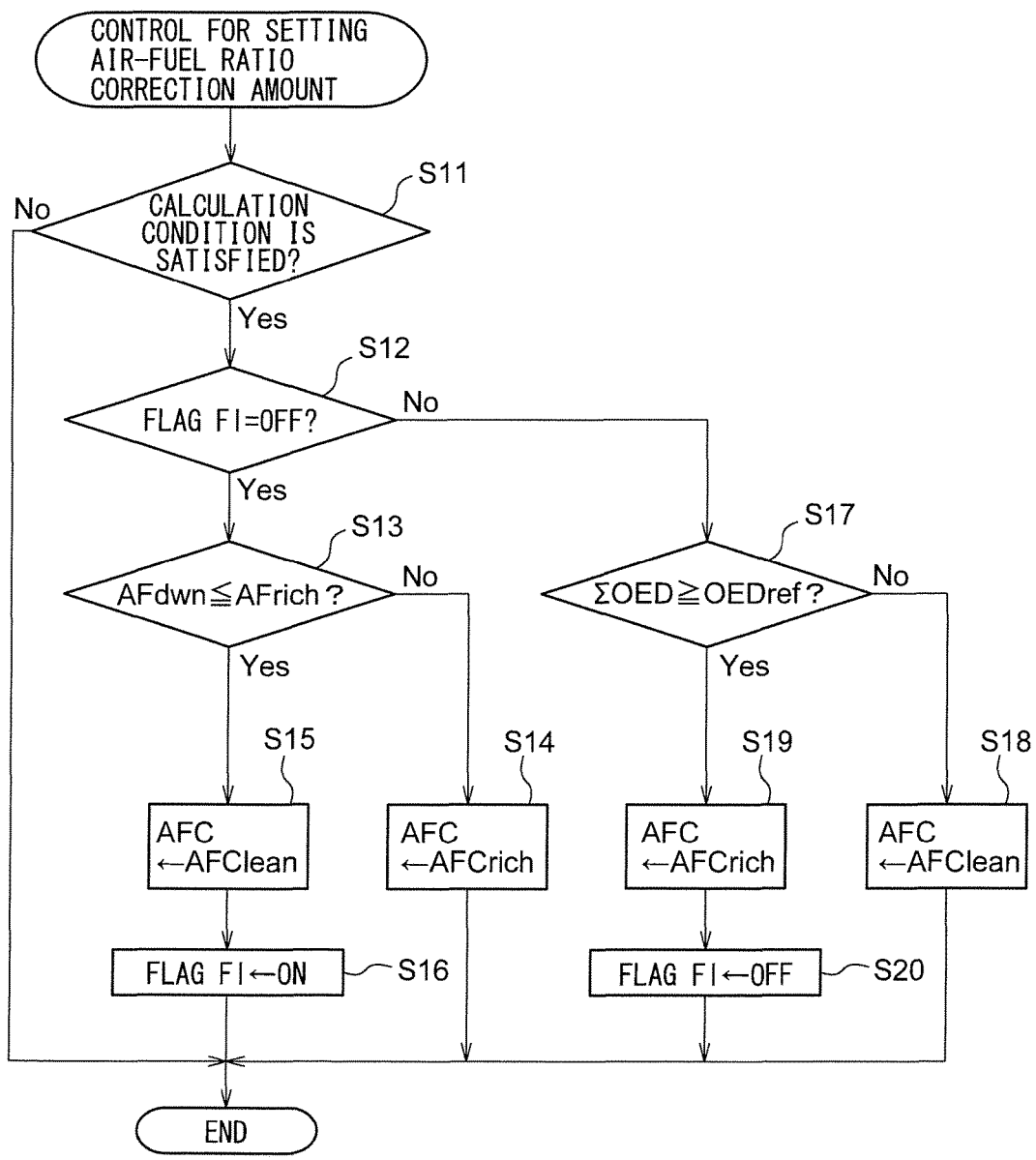
FIG. 12 is a flow chart showing a control routine of control for setting an air-fuel ratio correction amount.

FIG. 12 is a flow chart showing the control routine for control for setting the air-fuel ratio correction amount. The illustrated control routine is performed by interruption every predetermined time interval.

As shown in FIG. 12, first, at step S11, it is judged if a condition for calculation of the air-fuel ratio correction amount AFC is satisfied. As cases where the condition for calculation of the air-fuel ratio correction amount AFC is satisfied, being in the middle of normal control where feedback control is performed, for example, not being in the middle of fuel cut control etc. may be mentioned. If at step S11 it is judged that a condition for calculation of the air-fuel ratio correction amount AFC is satisfied, the routine proceeds to step S12.

At step S12, it is judged if the lean set flag Fl has been set to OFF. The lean set flag Fl is set ON if the air-fuel ratio correction amount AFC is set to the lean set correction amount AFClean and is set OFF in other cases. If at step S12 the lean set flag Fl is set OFF, the routine proceeds to step S13. At step S13, it is judged if the output air-fuel ratio AFdwn of the downstream side air-fuel ratio sensor 41 is the rich judged air-fuel ratio AFrich or less. If it is judged that the output air-fuel ratio AFdwn of the downstream side air-fuel ratio sensor 41 is larger than the rich judged air-fuel ratio AFrich, the routine proceeds to step S14. At step S14, the air-fuel ratio correction amount AFC is maintained at the rich set correction amount AFCrich as it is and the control routine is ended.

On the other hand, if the oxygen storage amount OSA of the upstream side exhaust purification catalyst 20 decreases and the air-fuel ratio of the exhaust gas flowing out from the upstream side exhaust purification catalyst 20 falls, at step S13, it is judged that the output air-fuel ratio AFdwn of the downstream side air-fuel ratio sensor 41 is the rich judged air-fuel ratio AFrich or less. In this case, the routine proceeds to step S15 where the air-fuel ratio correction amount AFC is switched to the lean set correction amount AFClean. Next, at step S16, the lean set flag Fl is set ON and the control routine is ended.

If the lean set flag Fl is set ON, at step S12 in the next control routine, it is judged that the lean set flag Fl is not set OFF then the routine proceeds to step S17. At step S17, it is judged if the cumulative oxygen excess/deficiency ΣOED from when the air-fuel ratio correction amount AFC is switched to the lean set correction amount AFClean is smaller than the switching reference value OEDref. If it is judged that the cumulative oxygen excess/deficiency ΣOED is smaller than the switching reference value OEDref, the routine proceeds to step S18 where the air-fuel ratio correction amount AFC continues to be maintained at the lean set correction amount AFClean as is and the control routine is ended. On the other hand, if the oxygen storage amount of the upstream side exhaust purification catalyst 20 increases, finally, at step S17, it is judged that the cumulative oxygen excess/deficiency ΣOED is the switching reference value OEDref or more and the routine proceeds to step S19. At step S19, the air-fuel ratio correction amount AFC is switched to the rich set correction amount AFCrich. Next, at step S20, the lean set flag Fl is reset to OFF and the control routine is made to end.

Figure 13:
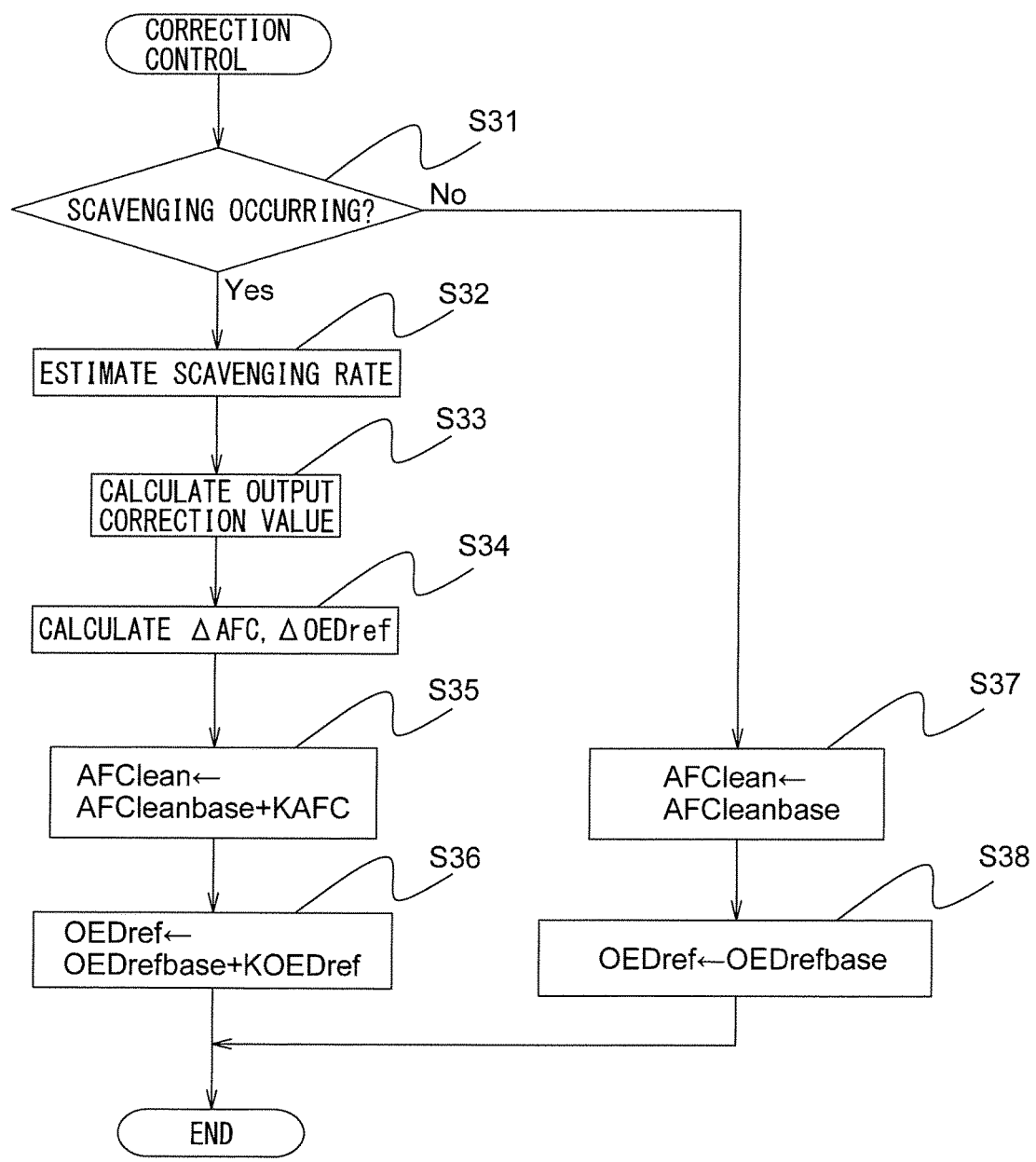
FIG. 13 is a flow chart showing control for correcting the lean set correction amount and switching reference value.

FIG. 13 is a flow chart showing the control for correcting the lean set correction amount AFClean and switching reference value OEDref. The illustrated control routine is performed by interruption every certain time interval.

As shown in FIG. 13, first, at step S31, it is judged if scavenging is occurring. Whether scavenging is occurring is, for example, estimated based on the amount of overlap, pressure inside the intake passage, etc. The amount of overlap is calculated based on the opening timing of the intake valve 6 and the closing timing of the exhaust valve 8, while the pressure inside the intake passage is detected by the pressure sensor 50. If at step S31 it is judged that scavenging is occurring, the routine proceeds to step S32. At step S32, for example, the scavenging rate is estimated based on the amount of overlap. Next, at step S33, based on the estimated value Sc of the scavenging rate calculated at step S32, the map such as shown in FIG. 7C is used to calculate the output correction value.

Next, at step S34, based on the output correction value calculated at step S33, the map such as shown in FIG. 10A is used to calculate the correction amount KAFC of the lean set correction amount AFClean. In addition, at step S34, based on the output correction value calculated at step S33, the map such as shown in FIG. 10B is used to calculate the correction amount KOED of the switching reference value OEDref. Next, at step S35, the predetermined reference lean set correction amount AFCleanbase plus the correction amount KAFC calculated at step S34 is made the lean set correction amount AFClean. Note that the reference lean set correction amount AFCleanbase is a lean set correction amount set when the scavenging rate is zero. Next, at step S36, the predetermined reference switching reference value OEDrefbase plus the correction amount KOEDref calculated at step S34 is made the switching reference value OEDref, and the control routine is made to end. Note that, the reference switching reference value OEDrefbase is a switching reference value set when the scavenging rate is zero.

On the other hand, when at step S31 it is judged that scavenging is not occurring, the routine proceeds to step S37. At step S37, the lean set correction amount AFClean is set to the reference lean set correction amount AFCleanbase. In addition, at step S38, the switching reference value OEDref is set to the reference switching reference value OEDrefbase, then the control routine is ended. The lean set correction amount AFClean calculated at steps S35 and S37 in this way is used at steps S15 and S18 of FIG. 12. Further, the switching reference value OEDref calculated at steps S36 and S38 is used at step S17 of FIG. 12.

Modifications

In this regard, in the above embodiment, as shown in FIG. 10A, the lean side correction value for the lean set correction amount AFClean is changed based on the output correction value, that is, based on the estimated value Sc of the scavenging rate. In other words, in the above embodiment, so long as the output correction value is constant, that is, so long as the estimated value Sc of the scavenging rate is constant, the lean side correction value is made constant.

However, the lean side correction value may be set so as to be changed even if the output correction value is constant. For example, at the time $t_5$ in FIG. 11, if the target air-fuel ratio is switched from the rich air-fuel ratio to the lean air-fuel ratio, then the output air-fuel ratio AFdwn of the downstream side air-fuel ratio sensor 41 is maintained at the rich judged air-fuel ratio AFrich or less, the lean side correction value may be made to increase in a step-wise manner once or a plurality of times or may be made to continuously increase.

Specifically, for example, if, at the time $t_5$ of FIG. 11, the elapsed time from when the target air-fuel ratio is switched from the rich air-fuel ratio to the lean air-fuel ratio, the cumulative intake air amount, etc. reaches a predetermined value, the lean side correction value is made to increase by exactly a predetermined amount. Further, the lean side correction value is made to increase by exactly a predetermined amount every time the elapsed time from when the target air-fuel ratio is switched from the rich air-fuel ratio to the lean air-fuel ratio or the cumulative intake air amount reaches a predetermined value. Alternatively, the longer the elapsed time from when switching the target air-fuel ratio from the rich air-fuel ratio to the lean air-fuel ratio or the greater the cumulative amount of intake air, the more the correction value to the lean side is made to increase. Therefore, in this modification, the amount of lean side correction is made to change based on not only the output correction value, but also the elapsed time from when switching the target air-fuel ratio from the rich air-fuel ratio to the lean air-fuel ratio.

In this way, by changing the amount of lean side correction based on the elapsed time from switching the target air-fuel ratio, the lean set correction amount AFClean is kept from being corrected to the lean side excessively more than necessary right after switching the target air-fuel ratio from a rich air-fuel ratio to a lean air-fuel ratio. On the other hand, if switching the target air-fuel ratio from a rich air-fuel ratio to a lean air-fuel ratio, then the output air-fuel ratio AFdwn of the downstream side air-fuel ratio sensor 41 is maintained at the rich judged air-fuel ratio AFrich or less, despite the target air-fuel ratio being set to the lean air-fuel ratio, it is believed the actual air-fuel ratio has become the stoichiometric air-fuel ratio or less. For this reason, by making the lean side correction value gradually increase, the actual air-fuel ratio is kept from being maintained at the stoichiometric air-fuel ratio or less.

REFERENCE SIGNS LIST 1. engine body
5. combustion chamber
6. intake valve
8. exhaust valve
11. fuel injector
18. throttle valve
20. exhaust purification catalyst
31. ECU
40. air-fuel ratio sensor
100. internal combustion engine
B, C. variable valve timing mechanism

The invention claimed is:

1. A control system of an internal combustion engine controlling an internal combustion engine comprising:
a variable valve timing mechanism able to change an amount of valve overlap between an intake valve and an exhaust valve,
an exhaust purification catalyst arranged in an exhaust passage and able to store oxygen, and
an upstream side air-fuel ratio sensor arranged at an upstream side of the exhaust purification catalyst in a direction of exhaust flow and detecting an air-fuel ratio of exhaust gas flowing into the exhaust purification catalyst, wherein
the control system further comprises an electronic control unit (ECU) controlling an air-fuel ratio of the exhaust gas flowing into the exhaust purification catalyst,
the ECU is configured to alternately set a target air-fuel ratio between a rich air-fuel ratio richer than a stoichiometric air-fuel ratio and a lean air-fuel ratio leaner than the stoichiometric air-fuel ratio and controls the air-fuel ratio of the exhaust gas flowing into the exhaust purification catalyst so that an output air-fuel ratio of the upstream side air-fuel ratio sensor becomes the target air-fuel ratio,
the ECU is configured to correct a parameter relating to the air-fuel ratio of the exhaust gas flowing into the exhaust purification catalyst under conditions of (1) when scavenging occurs so that air blows from an intake passage through a cylinder to the exhaust passage due to an occurrence of the valve overlap, (2) the air-fuel ratio of the exhaust gas flowing into the exhaust purification catalyst changes to a rich side wherein the changing amount is more than an amount of deviation from the actual air-fuel ratio expected to occur in the output air-fuel ratio of the upstream side air-fuel ratio sensor due to the occurrence of the scavenging, and
the ECU is configured to increase a lean degree of the target air-fuel ratio when setting the target air-fuel ratio to the lean air-fuel ratio when the scavenging occurs compared with when the scavenging does not occur.

2. The control system of an internal combustion engine according to claim 1, wherein when the scavenging occurs, the ECU is configured to increase the lean degree of the target air-fuel ratio when setting the target air-fuel ratio to the lean air-fuel ratio when a scavenging rate which is a ratio of an amount of scavenging to an amount of intake air becomes higher.

3. The control system of an internal combustion engine according to claim 1, wherein
the ECU is configured to estimate an oxygen storage amount of the exhaust purification catalyst based on the output air-fuel ratio of the upstream side air-fuel ratio sensor,
the ECU is configured to switch the target air-fuel ratio from the lean air-fuel ratio to the rich air-fuel ratio if the target air-fuel ratio is set to the lean air-fuel ratio when the estimated value of the oxygen storage amount becomes a switching reference storage amount smaller than a maximum storable oxygen amount or becomes more than the switching reference storage amount, and
the ECU is configured to increase the switching reference storage amount when the scavenging occurs compared with when the scavenging does not occur.

4. The control system of an internal combustion engine according to claim 2, wherein
the ECU is configured to estimate an oxygen storage amount of the exhaust purification catalyst based on the output air-fuel ratio of the upstream side air-fuel ratio sensor,
the ECU is configured to switch the target air-fuel ratio from the lean air-fuel ratio to the rich air-fuel ratio if the target air-fuel ratio is set to the lean air-fuel ratio when the estimated value of the oxygen storage amount becomes a switching reference storage amount smaller than a maximum storable oxygen amount or becomes more, and
the ECU is configured to increase the switching reference storage amount when the scavenging occurs compared with when the scavenging does not occur.

5. The control system of an internal combustion engine according to claim 3, wherein when the scavenging occurs, the ECU is configured to increase the switching reference storage amount as a scavenging rate which is a ratio of an amount of scavenging to an amount of intake air increases.

6. The control system of an internal combustion engine according to claim 4, wherein when the scavenging occurs, the ECU is configured to increase the switching reference storage amount as the scavenging rate which is a ratio of an amount of scavenging to an amount of intake air increases.

7. The control system of an internal combustion engine according to claim 1, wherein when the scavenging occurs, the ECU is configured to correct the parameter relating to the air-fuel ratio of the exhaust gas flowing into the exhaust purification catalyst so that the higher a scavenging rate which is an amount of scavenging to an amount of intake air, the more to the rich side the air-fuel ratio of the exhaust gas flowing into the exhaust purification catalyst changes.

8. The control system of an internal combustion engine according to claim 1, wherein the parameter relating to the air-fuel ratio of the exhaust gas flowing into the exhaust purification catalyst is an output air-fuel ratio of the upstream side air-fuel ratio sensor, a control center air-fuel ratio, the target air-fuel ratio, or an amount of feed of fuel from a fuel injector injecting fuel into a combustion chamber of the internal combustion engine.

* * * * *